US012273675B2

(12) United States Patent
Li et al.

(10) Patent No.: US 12,273,675 B2
(45) Date of Patent: Apr. 8, 2025

(54) LEAKAGE COMPENSATION METHOD AND SYSTEM FOR HEADPHONE

(71) Applicant: Bestechnic (Shanghai) Co., Ltd., Shanghai (CN)

(72) Inventors: Qian Li, Shanghai (CN); Zhicong Wang, Shanghai (CN); Xingqiang Wu, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 216 days.

(21) Appl. No.: 17/874,363

(22) Filed: Jul. 27, 2022

(65) Prior Publication Data

US 2023/0114392 A1 Apr. 13, 2023

(30) Foreign Application Priority Data

Oct. 12, 2021 (CN) .......................... 202111190216.5
Nov. 26, 2021 (CN) .......................... 202111427431.2

(51) Int. Cl.

*H04R 1/10* (2006.01)
*H04R 1/08* (2006.01)
*H04R 3/04* (2006.01)
*H04R 29/00* (2006.01)

(52) U.S. Cl.

CPC ............. *H04R 1/1041* (2013.01); *H04R 1/08* (2013.01); *H04R 3/04* (2013.01); *H04R 29/001* (2013.01)

(58) Field of Classification Search

CPC ..... A61M 2021/0027; G10K 11/17823; G10K 11/1783; G10K 11/17857; G10K 11/17873; G10K 11/17881; G10K 2210/1081; G10K 2210/3023; G10K 2210/3027; G10K 2210/3028; G10K 2210/503; H04R 1/08; H04R 1/1041; H04R 29/001; H04R 3/04

USPC ................................................ 381/56–58, 74

See application file for complete search history.

(56) References Cited

U.S. PATENT DOCUMENTS 11,468,875 B2 * 10/2022 Rui .................. G10K 11/17881
11,683,643 B2 * 6/2023 Goldstein ............. H04R 25/02 381/66
2018/0075862 A1 * 3/2018 Shi ........................ H04M 9/082
2020/0288244 A1 * 9/2020 Alcock ............ G10K 11/17873
2021/0190702 A1 * 6/2021 Wu ......................... G01S 7/411
2022/0076656 A1 * 3/2022 He ....................... H04R 1/1083
2022/0157291 A1 * 5/2022 McCutcheon ... G10K 11/17881

* cited by examiner

*Primary Examiner* — Lun-See Lao

(74) *Attorney, Agent, or Firm* — Bayes PLLC

(57) ABSTRACT

In certain aspects, a leakage compensation method and system for a headphone are disclosed. An audio reference signal is obtained responsive to an audio signal to be played by a speaker of the headphone. An audio feedback signal is obtained based on a microphone signal acquired by a microphone of the headphone responsive to the audio signal being played by the speaker. One or more compensation parameters of a compensation filter are determined based on the audio reference signal and the audio feedback signal. The compensation filter is configured using the one or more compensation parameters. A music signal is processed using the compensation filter to generate a leakage-compensated music signal to be played by the speaker.

17 Claims, 16 Drawing Sheets

LEAKAGE COMPENSATION METHOD AND SYSTEM FOR HEADPHONE

CROSS-REFERENCE TO RELATED APPLICATIONS

This application claims the benefit of priorities to Chinese Patent Application No. 202111190216.5, filed on Oct. 12, 2021, and Chinese Patent Application No. 202111427431.2, filed on Nov. 26, 2021, both of which are incorporated herein by reference in their entireties.

BACKGROUND

The present disclosure relates to a leakage compensation method and system for a headphone.

Headphones are widely used by users to bring in comfortable and enjoyable music listening experience in various noisy environments such as airports, subways, airplanes, restaurants, etc. However, even for the same headphone, a structure difference in each user's ear and ear canal may cause a different degree of leakage of the headphone, which can weaken a low-frequency part of a music signal played by the headphone and affect the user's listening experience. For example, for an in-ear earphone (e.g., especially a semi-in-ear earphone), different earphone wearing manners (such as different wearing tightness, different wearing directions, etc.) and individual differences in the users' ear canal structures (such as different ear canal lengths, different ear canal widths, and reflections, etc.) may affect a sound field of the earphone within the ear, leading to an unsatisfactory listening experience of the headphone.

Currently, headphones are equipped with different types of earplugs to attempt to solve the leakage problem caused by the ear-canal differences. However, some users may like to wear loose earplugs (rather than tight earplugs) in order to make the wearing experience more comfortable. The looseness of the earplugs can result in a severe leakage condition in the headphones, causing poor low-frequency listening experience on the headphones.

SUMMARY

According to one aspect of the present disclosure, a leakage compensation method for a headphone is disclosed. An audio reference signal is obtained responsive to an audio signal to be played by a speaker of the headphone. An audio feedback signal is obtained based on a microphone signal acquired by a microphone of the headphone responsive to the audio signal being played by the speaker. One or more compensation parameters of a compensation filter are determined based on the audio reference signal and the audio feedback signal. The compensation filter is configured using the one or more compensation parameters. A music signal is processed using the compensation filter to generate a leakage-compensated music signal to be played by the speaker.

According to another aspect of the present disclosure, a headphone is disclosed. The headphone includes a speaker configured to play an audio signal. The headphone further includes a microphone configured to acquire a microphone signal responsive to the audio signal being played by the speaker. The headphone additionally includes a processor configured to: obtain an audio reference signal responsive to the audio signal to be played by the speaker; obtain an audio feedback signal based on the microphone signal; determine one or more compensation parameters of a compensation filter based on the audio reference signal and the audio feedback signal; and configure the compensation filter using the one or more compensation parameters. The headphone also includes a compensation filter configured to process a music signal to generate a leakage-compensated music signal to be played by the speaker.

According to yet another aspect of the present disclosure, a leakage compensation system for a headphone is disclosed. The leakage compensation system includes a memory storing code and a processor coupled to the memory. When the code is executed, the processor is configured to: obtain an audio reference signal responsive to an audio signal to be played by a speaker of the headphone; obtain an audio feedback signal based on a microphone signal acquired by a microphone of the headphone responsive to the audio signal being played by the speaker; determine one or more compensation parameters of a compensation filter based on the audio reference signal and the audio feedback signal; configure the compensation filter using the one or more compensation parameters; and process a music signal using the compensation filter to generate a leakage-compensated music signal to be played by the speaker.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
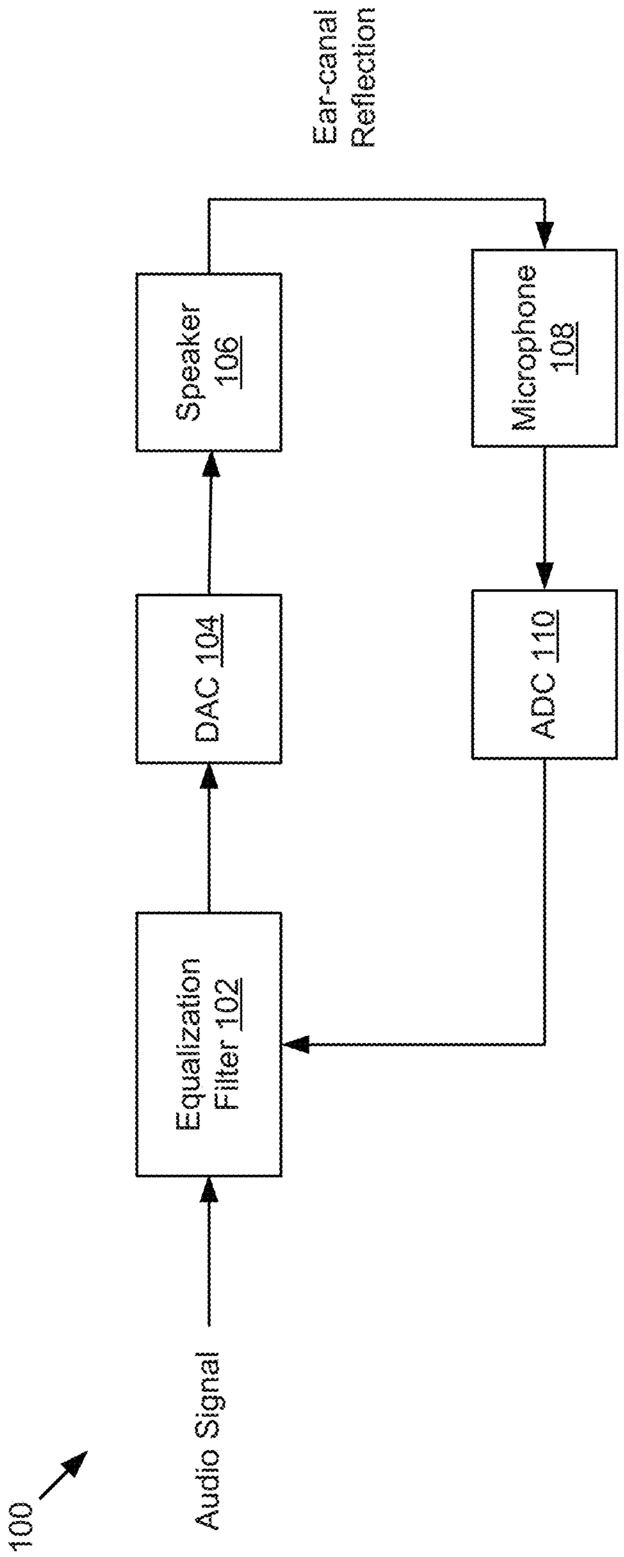
FIG. 1 illustrates a block diagram of an exemplary process for compensating leakage in a headphone, according to some examples.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 illustrates a block diagram of an exemplary process 100 for compensating leakage in a headphone, according to some examples. The headphone may include an equalization filter 102, a digital-to-analog converter (DAC) 104, a speaker 106, a microphone 108, an analog-to-digital converter (ADC) 110, and any other suitable component not shown in FIG. 1. In some implementations, the headphone may be an earbud with speaker 106 and microphone 108 placed inside an ear canal of a user when the earbud is worn by the user.

As shown in FIG. 1, an audio signal to be played by the headphone may be filtered by equalization filter 102 to adjust an amplitude and/or a phase of the audio signal to compensate for defects of a sound field of the headphone caused by various factors. This filtering adjustment of the audio signal can take the preferences of different users or different tuners into account. The audio signal filtered by equalization filter 102 can then be processed by DAC 104 and fed to speaker 106 for playback, so that the audio signal can be heard by a human ear via ear canal reflection. Microphone 108 (e.g., an in-ear microphone) may capture a sound through the ear canal reflection when the audio signal is played by speaker 106, and may generate a microphone signal thereof. The microphone signal may be processed by ADC 110 and fed back to equalization filter 102.

At present, preset filter coefficients of equalization filter 102 are usually adjusted and obtained by a tuner through trial listening, and are configured as factory settings for the headphone. The preset filter coefficients can be used to configure equalization filter 102 of headphones with the same model or similar models to achieve equalization processing. However, a sound leakage may exist even for the same type of headphones due to ear-canal differences of different users (e.g., structures of the ear canals of individual users may be different with different lengths of the ear canals, different widths of the ear canals, different reflection effects, etc.). Besides, different headphone wearing manners (such as different wearing tightness, different wearing directions, etc.) may also cause the sound leakage of the same headphone when the headphone is worn by different users. The sound leakage can result in poor sound quality for different users. For example, the sound leakage may deteriorate the sound quality of the headphone and make the listening experience of the headphone less enjoyable. Equalization filter 102 configured with the preset filter coefficients that are obtained during the trial listening fails to remedy the defect of the sound leakage, and cannot provide high-quality listening experience for different users in different usage scenarios.

The present disclosure disclosed herein provides a leakage compensation method and system that can compensate for a sound leakage of a headphone through a configuration of a compensation filter, so that a listening experience of the headphone can be improved for different users in different usage scenarios. For example, the method and system disclosed herein may filter an audio signal (e.g., a first music signal to be played by a speaker of the headphone) using a reference-path filter to generate a music reference signal. The method and system disclosed herein may also generate an audio feedback signal based on a microphone signal acquired by a microphone of the headphone responsive to the audio signal being played by the speaker. The method and system disclosed herein may then determine one or more compensation parameters of the compensation filter based on the audio reference signal and the audio feedback signal, and may configure the compensation filter using the one or more compensation parameters. Subsequently, the method and system disclosed herein may process a second music signal to be played by the speaker of the headphone using the compensation filter, so that a leakage-compensated music signal can be generated and played by the speaker. The first and second music signals may be different music signals or the same music signal. Through the playing of the leakage-compensated music signal, a listening experience (e.g., a low-frequency listening experience) of the headphone with different wearing manners and/or different ear canal structures of various users can be effectively improved.

Consistent with the present disclosure, the method and system disclosed herein may determine a current frequency response of an acoustic path from the speaker to the microphone of the headphone based on the audio signal and the audio feedback signal. The current frequency response may reflect a current leakage condition of the headphone. In real time or near real time, the method and system disclosed herein may determine the compensation parameters of the compensation filter based on (a) the current frequency response of the acoustic path and (b) a predetermined matching relationship between a group of reference frequency responses of the acoustic path and a group of reference parameter sets of the compensation filter. The method and system disclosed herein may configure the compensation filter using the compensation parameters and process a music signal to be played using the compensation filter, so that a leakage-compensated music signal can be generated and played by the speaker of the headphone in real time or near real time.

Consistent with the present disclosure, the method and system disclosed herein can make full use of a music signal that a user listens to when using the headphone, and appropriately supplement the music signal with a pilot tone signal if needed without introducing other playback that may interfere with the user's music listening experience. The method and system disclosed herein may adjust the compensation parameters of the compensation filter in a timely manner based on the playing of the music signal and/or the pilot tone signal, so that the sound field of the headphone can be effectively compensated by the compensation filter under various leakage conditions in different usage scenarios. Thus, the user's listening experience with the headphone can be greatly enhanced. Especially when the strength of the music signal is relatively small, the combination of the music signal and the pilot tone signal can improve the robustness of the determination of the current frequency response of the acoustic path and thus enhance the anti-interference ability of the leakage detection of the method and system disclosed herein.

Figure 2A:
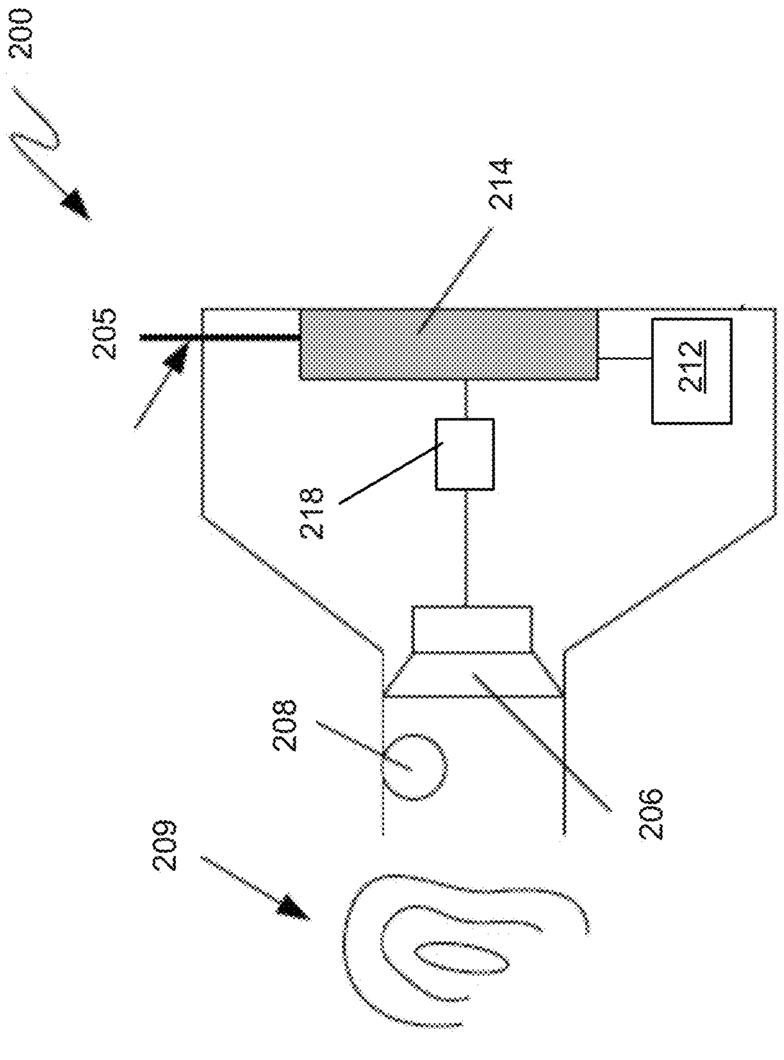
FIG. 2A illustrates a block diagram of an exemplary headphone with leakage compensation, according to some aspects of the present disclosure.

FIG. 2A illustrates a block diagram of an exemplary headphone 200 with leakage compensation, according to some aspects of the present disclosure. Headphone 200 may be a wired (or wireless) loudspeaker that can be worn on (or around) a head of a user over (or inside) an ear 209 of the user. In some implementations, headphone 200 may be an earbud (also known as an earpiece), an open earphone, a semi-open earphone, or a wireless headphone that can be plugged into the user's ear canal when headphone 200 is worn by the user. In some implementations, headphone 200 may be part of a headset, which is physically held by a band over the head of the user. Headphone 200 may include a processor 214, a memory 212, an internal microphone 208, a speaker 206, an audio receiving unit 205, a compensation filter 218, and any other suitable component.

Audio receiving unit 205 may be an antenna for wirelessly receiving an audio signal from an audio source (not shown) or an audio cable connected to the audio source for transmitting the audio signal to processor 214. The audio source may include, but not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. In some implementations, the audio signal may include a music signal from a music source, such as a phone or a music player. In some implementations, the audio signal may include a pilot tone signal from a signal generator.

Speaker 206 may be any suitable electroacoustic transducer that converts an electrical signal (e.g., representing the audio information provided by the audio source) to a corresponding audio sound. In some implementations, speaker 206 may be configured to play audio based on the audio signal.

Internal microphone 208 may be any transducer that converts an audio sound into an electrical signal (referred to as a microphone signal herein). Internal microphone 208 may be disposed inside the ear canal when headphone 200 is worn by the user and configured to obtain a microphone signal based on the audio played by speaker 206. That is, by disposing internal microphone 208 inside the user's ear canal, any sound in the ear canal can be obtained up by internal microphone 208, which includes the audio signal currently being played by speaker 206.

Processor 214 may be coupled to memory 212. In some implementations, processor 214 may be configured to perform the leakage compensation function disclosed herein. Processor 214 may include any appropriate type of microprocessor, central processing unit (CPU), graphics processing unit (GPU), digital signal processor, or microcontroller suitable for audio processing. Processor 214 may include one or more hardware units (e.g., portion(s) of an integrated circuit) designed for use with other components or to execute part of an audio processing program. The program may be stored on a computer-readable medium, and when executed by processor 214, it may perform one or more functions disclosed herein. Processor 214 may be configured as a separate processor module dedicated to performing leakage compensation. Alternatively, processor 214 may be configured as a shared processor module for performing other functions unrelated to leakage compensation Processor 214 may be a complex instruction set computing (CISC) microprocessor, a reduced instruction set computing (RISC) microprocessor, a very long instruction word (VLIW) microprocessor, a processor executing any other type of instruction sets, or a processor that executes a combination of different instruction sets. In some implementations, processor 214 may be a special-purpose processor rather than a general-purpose processor. Processor 214 may include one or more special-purpose processing devices, such as application specific integrated circuits (ASICs), field programmable gate arrays (FPGAs), digital signal processors (DSPs), systems on a chip (SoCs), and the like.

Memory 212 may include any appropriate type of mass storage provided to store any type of information that processor 214 may need to operate. For example, memory 212 may be a volatile or non-volatile, magnetic, semiconductor-based, tape-based, optical, removable, non-removable, or other type of storage device or tangible (i.e., non-transitory) computer-readable medium including, but not limited to, a Read-Only Memory (ROM), a flash memory, a dynamic Random Access Memory (RAM), and a static RAM. Memory 212 may be configured to store one or more computer programs that may be executed by processor 214 to perform functions disclosed herein. Memory 212 may be further configured to store information and data used by processor 214.

Compensation filter 218 may be configured to filter a music signal to be played by speaker 206 and generate a leakage-compensated music signal thereof. Compensation filter 218 is described below in more detail with reference to FIGS. 2B-2G.

FIGS. 2B-2G illustrate block diagrams of various exemplary implementations of a headphone with leakage compensation, according to some aspects of the present disclosure. The headphone in any of FIGS. 2B-2C may have a structure like that of FIG. 2A, and may include any other appropriate components not shown in FIG. 2A.

Figure 2B:
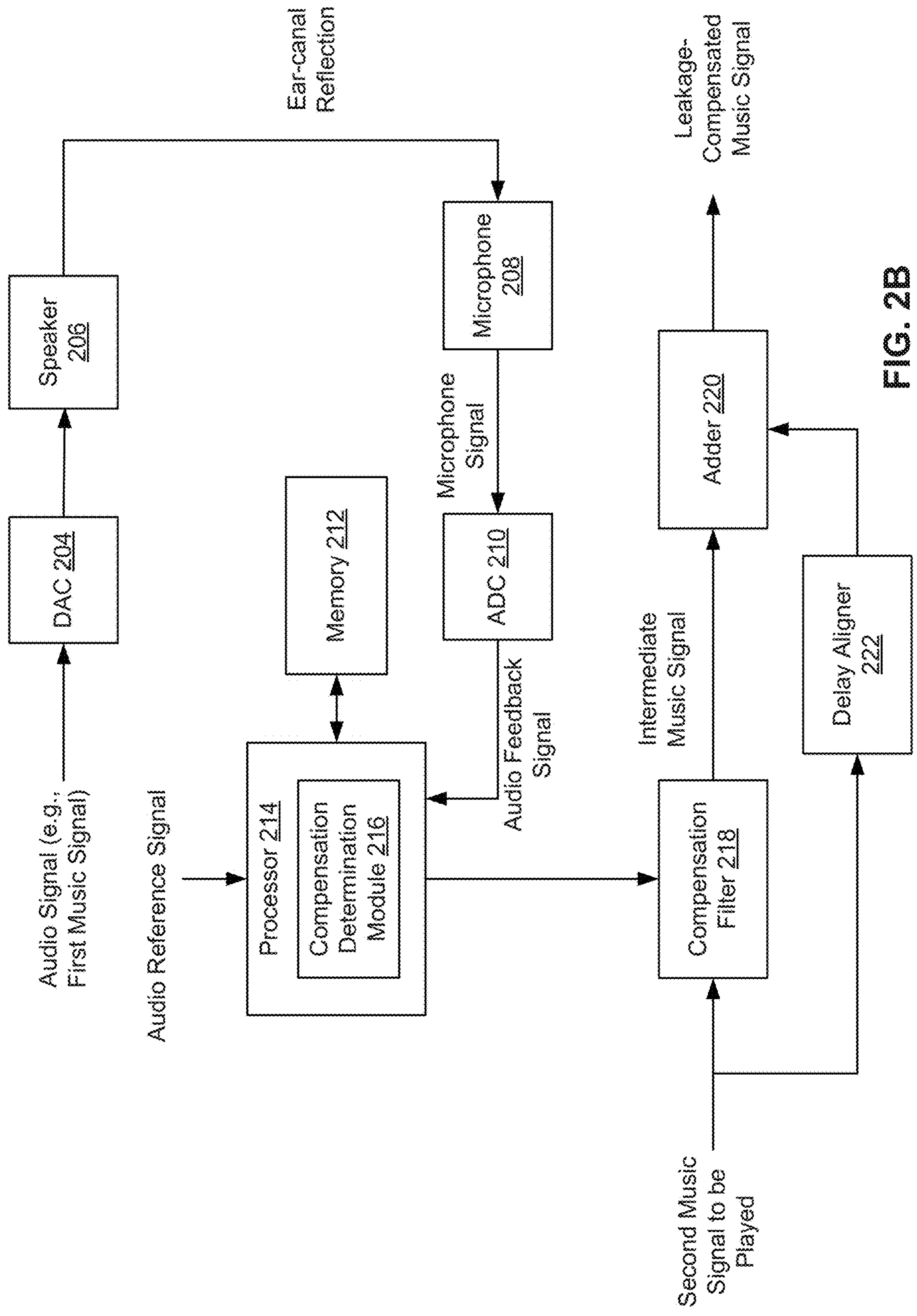
FIGS. 2B-2G illustrate block diagrams of various exemplary implementations of a headphone with leakage compensation, according to some aspects of the present disclosure.

Referring to FIG. 2B, an audio signal from an audio source may be played by speaker 206 of the headphone. For example, the audio signal may be processed by a DAC 204 and then played by speaker 206. An audio sound generated by the playing of the audio signal may be reflected by an ear canal of the user and captured by microphone 208 placed inside the ear of the user. An audio reference signal may be obtained based on the audio signal to be played by speaker 206 and may be inputted to a compensation determination module 216 of processor 214.

Microphone 208 of the headphone may be configured to generate a microphone signal responsive to the audio signal being played by speaker 206. For example, the audio sound generated by the playing of the audio signal may be reflected by the ear canal of the user and captured by microphone 208 to generate the microphone signal. The microphone signal may be processed by an ADC 210 and converted into an audio feedback signal. That is, the audio feedback signal may be obtained based on the microphone signal acquired by microphone 208 of the headphone responsive to the audio signal being played by speaker 206. The audio feedback signal may be fed to compensation determination module 216 of processor 214.

In some implementations, the audio signal may include a first music signal to be played by speaker 206, the audio reference signal may include a music reference signal generated from the first music signal, and the audio feedback signal may include a music feedback signal, as described below in more detail with reference to FIGS. 2C-2D. In some implementations, the audio signal may include a pilot tone signal to be played by speaker 206, the audio reference signal may include the pilot tone signal, and the audio feedback signal may include a pilot tone feedback signal, as described below in more detail with reference to FIG. 2E. In some implementations, the audio signal may include both the first music signal and the pilot tone signal, the audio reference signal may include a combination of the music reference signal and the pilot tone signal, and the audio feedback signal may include a combination of the music feedback signal and the pilot tone feedback signal, as described below in more detail with reference to FIG. 2F.

In some implementations, if a strength of the music reference signal (or a strength of the first music signal) is equal to or greater than a first signal threshold, the audio reference signal may be configured to include the music reference signal, and the audio feedback signal may include the music feedback signal, as described below in more detail with reference to FIG. 2G. Alternatively, if the strength of the music reference signal (or the strength of the first music signal) is smaller than the first signal threshold, the audio reference signal may be configured to include the pilot tone signal, and the audio feedback signal may include the pilot tone feedback signal, as described below in more detail with reference to FIG. 2G. Alternatively, if the strength of the music reference signal (or the strength of the first music signal) is smaller than the first signal threshold, the audio reference signal may also be configured to include a combination of the music reference signal and the pilot tone signal, and the audio feedback signal may include a combination of the music feedback signal and the pilot tone feedback signal, as described below in more detail with reference to FIG. 2F.

Compensation determination module 216 may be configured to determine one or more compensation parameters of compensation filter 218 based on the audio reference signal and the audio feedback signal. Initially, compensation determination module 216 may determine a current frequency response of an acoustic path from speaker 206 to microphone 208 based on the audio signal and the audio feedback signal. An exemplary method for determining the current frequency response of the acoustic path is illustrated below with reference to FIG. 3B. Exemplary frequency responses of the acoustic path are illustrated below with reference to FIG. 4. In the present disclosure, an amplitude characteristic (e.g., an amplitude curve) of the acoustic path is used as an example of a frequency response of the acoustic path. It is contemplated that other characteristics of the acoustic path (e.g., a phase characteristic such as a phase curve) can be used as examples of the current frequency response, which is not limited herein.

Next, compensation determination module 216 may determine one or more compensation parameters of compensation filter 218 based on the current frequency response of the acoustic path and a predetermined matching relationship between a group of reference frequency responses of the acoustic path and a group of reference parameter sets of compensation filter 218. In some implementations, the one or more compensation parameters of compensation filter 218 may include a filter type and/or filter coefficients (e.g., self-adaptive filter coefficients). For example, the one or more compensation parameters may indicate whether compensation filter 218 is a frequency-domain filter or a time-domain filter, and may include corresponding filter coefficients for the frequency-domain or time-domain filter. A time-domain filter may include a finite impulse response (FIR) filter or an infinite impulse response (IIR) filter.

In some implementations, the one or more compensation parameters of compensation filter 218 may be adaptively adjusted in real time or near real time. For example, the one or more compensation parameters can be calculated using an online self-adaptive calculation method or an off-line self-adaptive calculation method. In another example, the one or more compensation parameters can be calculated using a Normalized Least Mean Square (NLMS) method. As a result, even if a wearing manner of the headphone is changed during a music playing process, which may result in a different leakage condition of the headphone, the listening experience of the headphone is not downgraded because the different leakage conditions can be compensated by compensation filter 218 with the updated compensation parameters timely.

In some implementations, the predetermined matching relationship between the group of reference frequency responses of the acoustic path and the group of reference parameter sets of compensation filter 218 may be determined during a design phase of the headphone with respect to different leakage conditions of the headphone. For example, each reference frequency response of the acoustic path may correspond to one or more leakage conditions of the headphone, and a corresponding reference parameter set (e.g., including one or more reference compensation parameters) can be determined for compensation filter 218 to compensate the one or more leakage conditions of the headphone.

For example, in the design phase, different reference frequency responses of the acoustic path can be measured under different usage scenarios of the headphone (such as the headphone being worn very loosely, loosely, tightly, or very tightly, etc.) which correspond to different leakage conditions of the headphone. For each of the reference frequency responses, one or more parameters of compensation filter 218 can be updated automatically or manually until music played by speaker 206 achieves a satisfactory equalization effect (e.g., until a tuner of the headphone determines that the music played by speaker 206 achieves a satisfactory listening experience). In this case, the one or more updated parameters that achieve the satisfactory equalization effect can be determined to be one or more reference compensation parameters in a reference parameter set for the reference frequency response. Thus, by performing similar operations for the group of reference frequency responses, a group of reference parameter sets can be determined for the group of reference frequency responses, respectively.

In some implementations, the correspondence between each reference frequency response and the one or more corresponding leakage conditions of the headphone may be pre-measured or predetermined in the design phase in various usage scenarios corresponding to various leakage conditions of the headphone. The various usage scenarios may be determined by different wearing manners and different ear canal structures of the users (or artificial ears). For example, different wearing manners (such as different wearing tightness, different wearing directions, etc.) and different ear canal structures (such as different ear canal lengths, different ear canal widths, etc.) may have different impacts on the leakage of headphone, which correspond to different usage scenarios of the headphone.

In some implementations, compensation determination module 216 may determine, from the group of reference frequency responses, one or more reference frequency responses that match the current frequency response. For example, the one or more reference frequency responses match the current frequency response if a maximum difference between each of the one or more reference frequency responses and the current frequency response is not greater than a predetermined matching threshold. Then, compensation determination module 216 may determine, from the group of reference parameter sets, one or more reference parameter sets corresponding to the one or more reference frequency responses, respectively, and determine the one or more compensation parameters based on the one or more reference parameter sets. For example, compensation determination module 216 may select a reference frequency response from the one or more reference frequency responses, and use one or more reference compensation parameters in a reference parameter set corresponding to the selected reference frequency response as the one or more compensation parameters for compensation filter 218. In another example, compensation determination module 216 may determine each of the one or more compensation parameters to be a weighted average of one or more corresponding reference compensation parameters included in the one or more reference parameter sets.

Consistent with the present disclosure, by comparing the current frequency response with the group of reference frequency responses of the acoustic path, compensation determination module 216 can determine one or more reference frequency responses matching the current frequency response. Then, based on the one or more reference frequency responses, compensation determination module 216 can not only determine the one or more compensation parameters of compensation filter 218, but also can determine the current leakage condition of the headphone. For example, the current leakage condition can be one of the leakage conditions corresponding to the one or more reference frequency responses, or an average of the leakage conditions corresponding to the one or more reference frequency responses.

Subsequently, compensation determination module 216 may configure compensation filter 218 using the one or more compensation parameters. Then, a second music signal to be played by speaker 206 may be processed using compensation filter 218 to generate a leakage-compensated music signal, so that the leakage-compensated music signal (rather than the second music signal) can be played by speaker 206. For example, the second music signal can be processed by compensation filter 218 to generate an intermediate music signal. The second music signal may also be processed by a delay aligner 222 to adjust a delay of the second music signal, so that the delay of the second music signal is aligned with the intermediate music signal. Then, an adder 220 can add the intermediate music signal to the second music signal to generate the leakage-compensated music signal. The leakage-compensated music signal can reduce or eliminate the impact of the leakage of the headphone caused by different wearing manners (such as different wearing tightness, different wearing directions, etc.) and different ear canal structures (such as different ear canal lengths, different ear canal widths, etc.). Thus, the listening experience of the headphone can be improved under different usage scenarios.

Figure 2C:
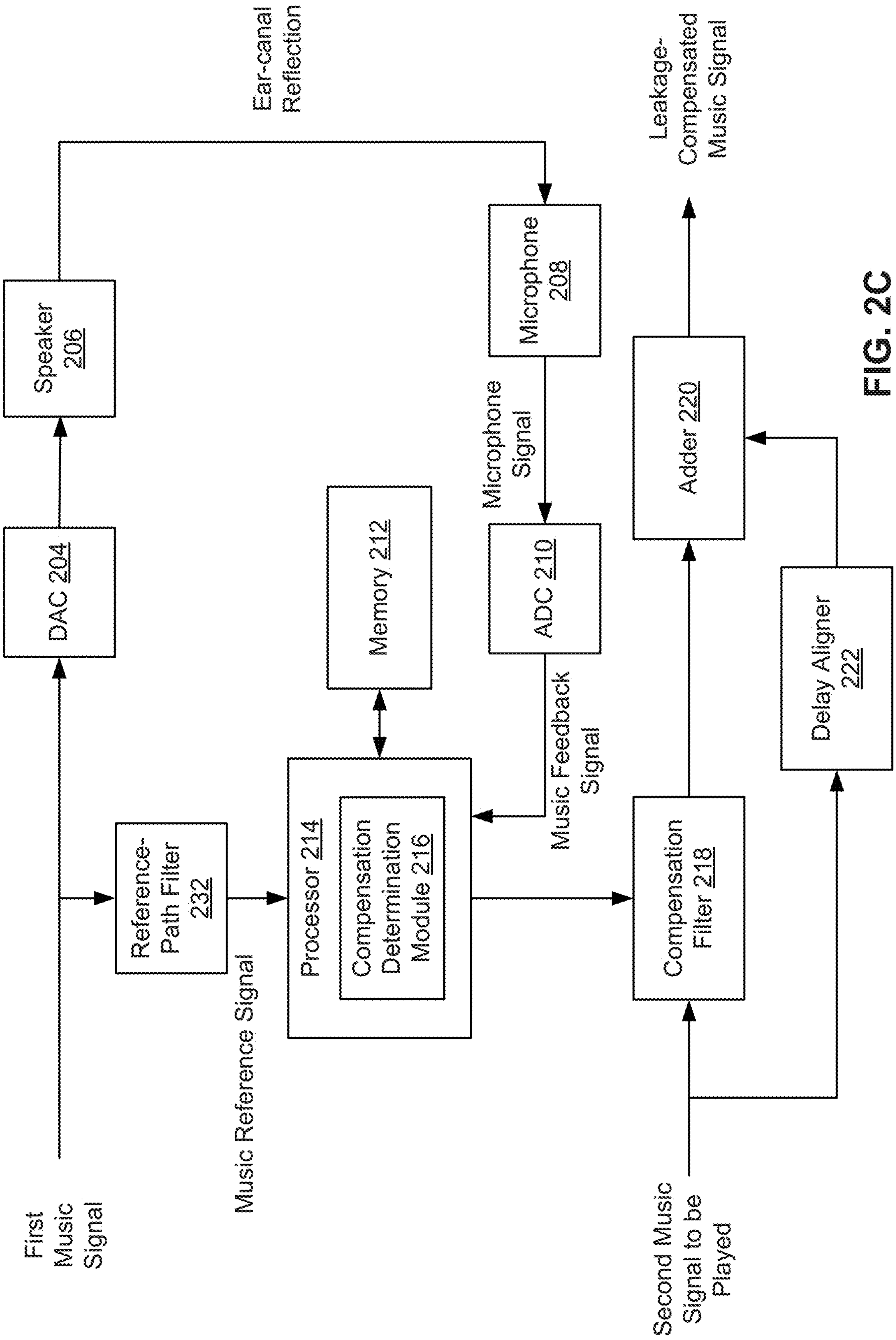

FIG. 2C illustrates an exemplary scenario when an audio signal to be played by speaker 206 of a headphone only includes a first music signal, according to some aspects of the present disclosure. The headphone of FIG. 2C may further include a reference-path filter 232. One or more reference parameters of reference-path filter 232 may be predetermined. For example, in a test phase of the headphone using an artificial ear, a test music signal to be played by speaker 206 can be obtained, and a test microphone signal corresponding to the test music signal can be captured by microphone 208 when the test music signal is played by speaker 206. A frequency response of a sound path from the test music signal to the test microphone signal can be determined and the one or more reference parameters of reference-path filter 232 can be calculated by an adaptive filter or full matrix inversion method.

Reference-path filter 232 may be configured using the one or more reference parameters. Reference-path filter 232 may filter the audio signal (e.g., the first music signal) to generate a music reference signal, which is then fed to compensation determination module 216.

The first music signal may also be processed by DAC 204 and then played by speaker 206 to generate an acoustic signal. Through the ear-canal reflection, microphone 208 may capture at least part of the acoustic signal and generate a microphone signal. The microphone signal may be processed by ADC 210 to generate an audio feedback signal. In FIG. 2C, the audio feedback signal only includes a music feedback signal. The music feedback signal can be fed to compensation determination module 216.

Compensation determination module 216 may determine one or more compensation parameters of compensation filter 218 based on the audio reference signal and the audio feedback signal. For example, compensation determination module 216 may determine a current frequency response of an acoustic path from speaker 206 to microphone 208 based on the audio signal and the audio feedback signal. Compensation determination module 216 may determine the one or more compensation parameters of compensation filter 218 based on the current frequency response of the acoustic path and a predetermined matching relationship between a group of reference frequency responses of the acoustic path and a group of reference parameter sets of the compensation filter, as described above with reference to FIG. 2B.

In another example, compensation filter 218 may determine filter coefficients of compensation filter 218 at a time point of n+1 as follows:

$$h(n+1) = h(n) + \mu\frac{y(n)e(n)}{y^T(n)y(n)}, \tag{1}$$

$$f(n+1) = h(n+1) - [1, 0, 0, \ldots, 0]. \tag{2}$$

In the above equations (1) and (2), $h(n)=[h_0(n), h_1(n), h_2(n), \ldots, h_{M-1}(n)]^T$. f(n+1) denotes the filter coefficients of compensation filter 218 at the time point of n+1. n denotes an integer with n≥0. M denotes a length of compensation filter 218. y denotes a step size of compensation filter 218. $y(n)=[y(n), y(n-1), \ldots, y(n-M+1)]^T$ denotes the audio feedback signal at a time point of n. $e(n)=x(n)-h^T(n)y(n)$ denotes a residual signal at the time point of n, and x(n) denotes the music reference signal at the time point of n.

Then, compensation determination module 216 may configure compensation filter 218 using the one or more compensation parameters. A second music signal to be played by speaker 206 may be processed using compensation filter 218 to generate a leakage-compensated music signal as described above with reference to FIG. 2B. Thus, the leakage-compensated music signal can be played by speaker 206 to improve the listening experience of the headphone.

An exemplary flow of leakage compensation illustrated in FIG. 2C is provided herein. At the time point of n, the first music signal may be filtered by reference-path filter 232 to generate the music reference signal x(n). Also at the time point of n, the first music signal may processed by DAC 204 and played by speaker 206, so that the music feedback signal y(n) at the time point of n can be obtained through microphone 208. Compensation determination module 216 may determine the one or more compensation filter coefficients f(n+1) for the time point of n+1 using the above equations (1) and (2) based on the music reference signal x(n) and the music feedback signal y(n). At the time point of n+1, the second music signal may be filtered by compensation filter 218 to generate the leakage-compensated music signal, so that the leakage-compensated music signal can be played by speaker 206.

Consistent with the present disclosure, the second music signal and the first music signal can be the same music signal. For example, the first and second music signals can be the same music signal at different time points (e.g., the $n^{th}$ time point and the $(n+1)^{th}$ time point, respectively). Alternatively, the second music signal can be a music signal different from the first music signal. For example, the first music signal can be a preset music signal, while the second music signal can be any music signal selected by the user.

Consistent with the present disclosure, the music reference signal generated by reference-path filter 232 and the music feedback signal received through microphone 208 can reflect a situation in which a listening effect of the headphone is deteriorated due to leakage caused by difference in a wearing manner and/or difference in a structure of an ear canal. Compensation filter 218 with compensation parameters determined based on the music reference signal and the music feedback signal can effectively improve the listening effect of the headphone. For example, a sound leakage caused by the difference in the wearing manner and/or difference in the structure of the ear canal can be effectively compensated by compensation filter 218, so that the listening experience of the headphone can be improved.

Specifically, the music reference signal is a first sound signal that is only filtered by reference-path filter 232 but not played by speaker 206, and the music feedback signal received through microphone 208 is a second sound signal acquired through microphone 208 after being reflected by the ear canal. The difference in the wearing manner and/or difference in the structure of the ear canal may not impact the music reference signal generated by reference-path filter 232, whereas the music feedback signal received through microphone 208 is affected by the difference in the wearing manner and/or difference in the structure of the ear canal. For example, the difference in the wearing manner of the headphone may lead to a cavity leakage in the ear canal, which may cause the first music signal played by speaker 206 to be partially leaked after being reflected by the ear canal. Then, only part of the first music signal played by speaker 206 is collected by microphone 208. Therefore, the music reference signal processed by reference-path filter 232 is basically not affected by the difference in the wearing manner and/or difference in the structure of the ear canal, whereas the music feedback signal received through microphone 208 may be different due to the difference in the wearing manner and/or difference in the structure of the ear canal. Thus, by determining the one or more compensation parameters based on the music reference signal and the music feedback signal, compensation filter 218 can effectively perform the leakage compensation function for the headphone.

Figure 2D:
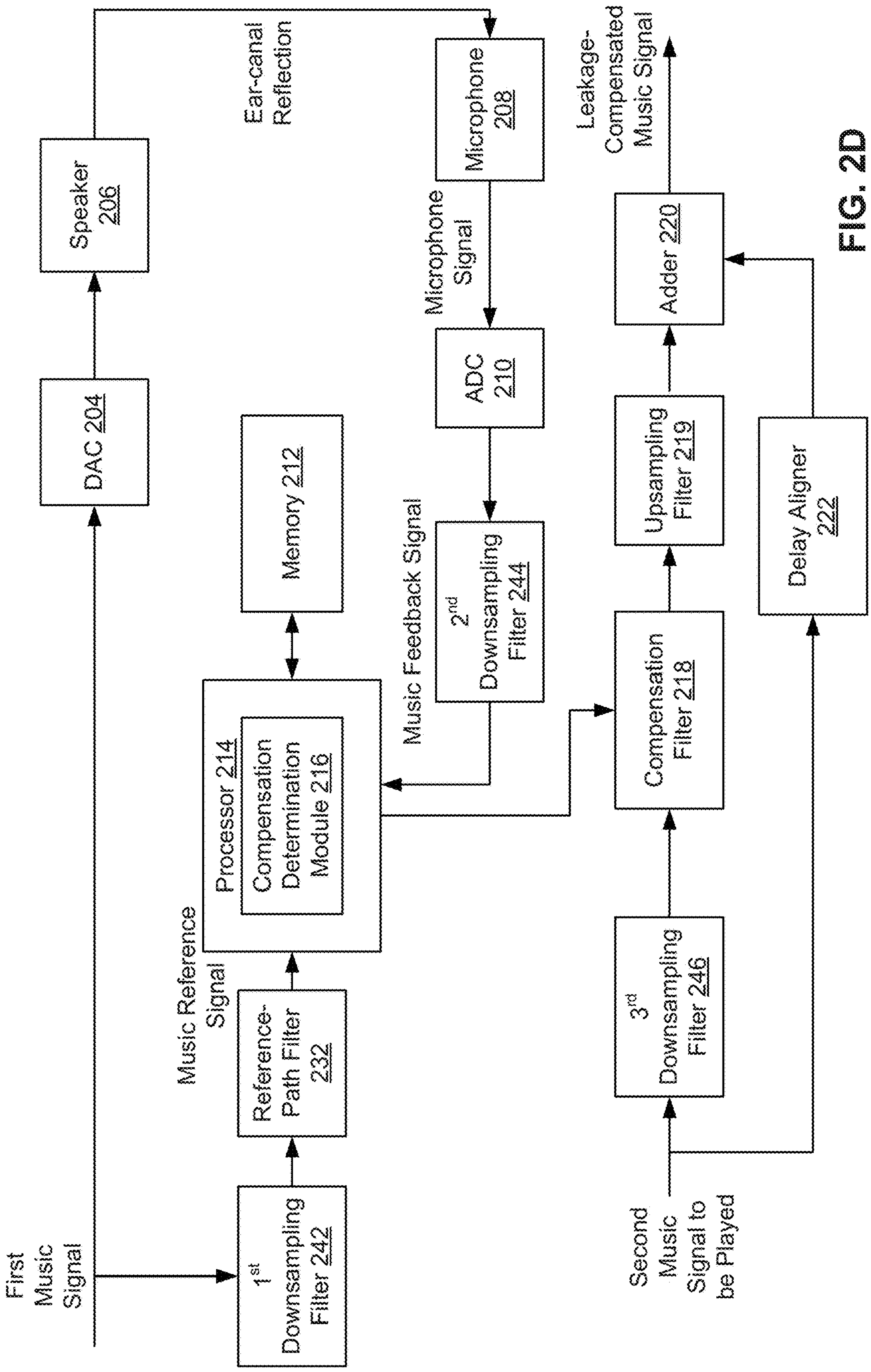

FIG. 2D illustrates another exemplary scenario when an audio signal to be played by speaker 206 of a headphone only includes a first music signal, according to some aspects of the present disclosure. The headphone of FIG. 2D may include components like that of FIG. 2C, and the similar description will not be repeated here. Comparing with FIG. 2C, the headphone of FIG. 2D may further include a first downsampling filter 242, a second downsampling filter 244, a third downsampling filter 246, and an upsampling filter 219.

In some implementations, since the difference in the wearing manner of the headphone or the difference in the structure of the ear canal of the user mainly affects low-frequency components of the first or second music signal, the first or second music signal can be downsampled to reduce computation complexity and save memory resource. For example, the first music signal can be downsampled by first downsampling filter 242 by N times (e.g., N being a positive integer) and then processed by reference-path filter 232 to generate a music reference signal. The first music signal can be played by speaker 206, so that a microphone signal can be acquired by microphone 208 responsive to the playing of the first music signal by speaker 206. The microphone signal can be processed by ADC 210 and downsampled by second downsampling filter 244 to generate a music feedback signal.

Next, compensation determination module 216 may determine one or more compensation parameters of compensation filter 218 based on the music reference signal and the music feedback signal. Compensation determination module 216 may configure compensation filter 218 using the one or more compensation parameters. Then, a second music signal to be played can be downsampled using third downsampling filter 246 to generate a downsampled music signal. The downsampled music signal can be filtered using compensation filter 218 to generate an intermediate music signal. The intermediate music signal can be upsampled using upsampling filter 219 to generate an upsampled intermediate music signal. The second music signal may also be processed by delay aligner 222 to align with the upsampled intermediate music signal. Adder 220 may then add the upsampled intermediate music signal to the second music signal to generate a leakage-compensated music signal.

In some implementations, the first music signal or the second music signal can be downsampled to a signal within 2 KHz or any appropriate frequency range, which is not limited herein.

Figure 2E:
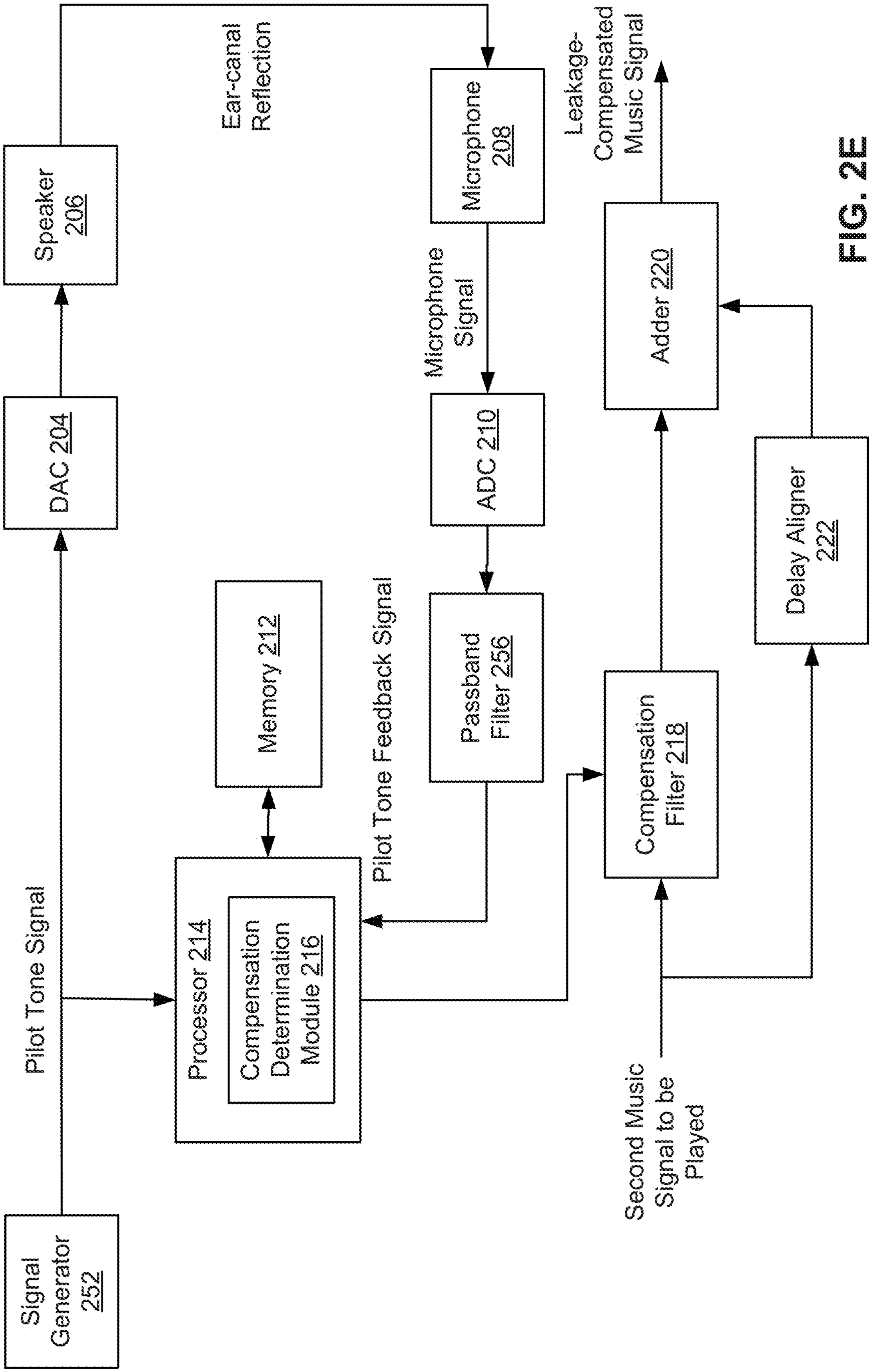

FIG. 2E illustrates an exemplary scenario when an audio signal to be played by speaker 206 of a headphone only includes a pilot tone signal, according to some aspects of the present disclosure. The headphone of FIG. 2E may include components like those of FIG. 2B, and the similar description will not be repeated herein. The headphone of FIG. 2E may further include a signal generator 252 and a passband filter 256. Passband filter 256 may be a peak filter.

Signal generator 252 may be configured to generate the pilot tone signal. The pilot tone signal may be used as an example of an audio reference signal and fed to compensation determination module 216. The pilot tone signal may also be processed by DAC 204 and played by 206. Microphone 208 may generate a microphone signal responsive to the pilot tone signal being played by speaker 206. The microphone signal may be processed by ADC 210 and filtered by passband filter 256 to generate a pilot tone feedback signal. The pilot tone feedback signal may be used as an example of an audio feedback signal and fed to compensation determination module 216.

Compensation determination module 216 may determine one or more compensation parameters of compensation filter 218 based on the pilot tone signal and the pilot tone feedback signal. For example, compensation determination module 216 may determine a current frequency response of an acoustic path from speaker 206 to microphone 208 based on the pilot tone signal and the pilot tone feedback signal. Compensation determination module 216 may determine the one or more compensation parameters of compensation filter 218 based on the current frequency response of the acoustic path and a predetermined matching relationship between a group of reference frequency responses of the acoustic path and a group of reference parameter sets of the compensation filter, as described above with reference to FIG. 2B.

In another example, compensation determination module 216 may determine a leakage monitor parameter based on the pilot tone signal and the pilot tone feedback signal. The leakage monitor parameter can be calculated as follows:

$$\det Val = \frac{\sum_{n=1}^{M} x(n) * y(n)}{\sum_{n=1}^{M} x(n) * x(n)}. \tag{3}$$

In the above equation (3), detVal denotes the leakage monitor parameter, n denotes a time point, M denotes a total number of time points used to calculate the leakage monitor parameter, x(n) and y(n) denote the pilot tone signal and the pilot tone feedback signal at the time point n, respectively.

The leakage monitor parameter may indicate a leakage condition of the headphone. Compensation determination module 216 may determine one or more reference frequency responses corresponding to the leakage condition indicated by the leakage monitor parameter from the group of reference frequency responses, and may determine one or more reference parameter sets corresponding to the one or more reference frequency responses. Compensation determination module 216 may determine the one or more compensation parameters of compensation filter 218 based on the one or more reference parameter sets. For example, compensation determination module 216 may select one of the one or more reference parameter sets to be the one or more compensation parameters of compensation filter 218.

Then, compensation determination module 216 may configure compensation filter 218 using the one or more compensation parameters. A second music signal to be played by speaker 206 may be processed using compensation filter 218 to generate a leakage-compensated music signal as described above with reference to FIG. 2B. Thus, the leakage-compensated music signal can be played by speaker 206 to improve the listening experience of the headphone.

Figure 2F:
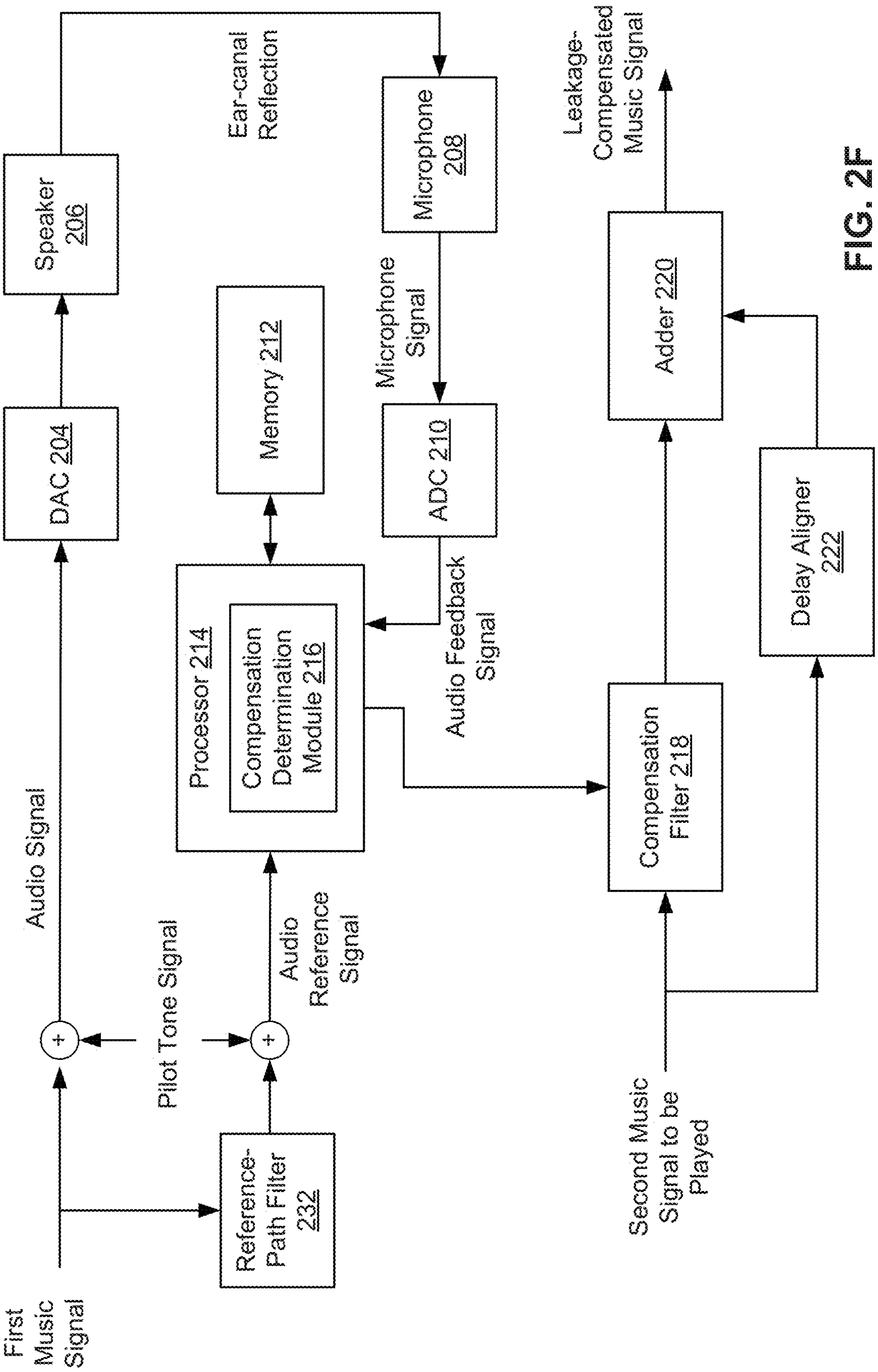

FIG. 2F illustrates an exemplary scenario when an audio signal to be played by speaker 206 includes both a first music signal and a pilot tone signal, according to some aspects of the present disclosure. A headphone of FIG. 2F may include components like those of any one of FIGS. 2B-2E, and the similar description will not be repeated herein.

Initially, the first music signal may be filtered by reference-path filter 232 to generate a music reference signal. Signal generator 252 (as shown in FIG. 2E) may generate a pilot tone signal. The pilot tone signal may be added to the first music signal to generate an audio signal to be played by speaker 206. The pilot tone signal may also be added to the music reference signal to generate an audio reference signal. For example, if a signal strength (e.g., in dB) of the music reference signal (or the first music signal) is equal to or greater than a first signal threshold, the audio signal only includes the first music signal, and the audio reference signal only includes the music reference signal, as described above with reference to FIGS. 2C-2D. If the signal strength of the music reference signal (or the first music signal) is smaller than the first signal threshold, the audio signal includes both the first music signal and the pilot tone signal, and the audio reference signal includes both the music reference signal and the pilot tone signal, as described herein with reference to FIG. 2F.

Consistent with the present disclosure, when the signal strength of the music reference signal (or the first music signal) is smaller than the first signal threshold, it is determined that the signal strength of the music reference signal (or the first music signal) is relatively small and is easily interfered by noise. In this case, the pilot tone signal can be added to the music reference signal as well as the first music signal to improve the effectiveness of the leakage compensation function. Since the frequency of the pilot tone signal is outside a hearing range of the human ear, the playback of the pilot tone signal cannot be heard by the human ear, which avoids introducing additional interference to the user. Besides, the pilot tone signal can be played at any time based on the needs of the leakage compensation, which makes the application of the leakage compensation function disclosed herein more flexible.

Consistent with the present disclosure, the first music signal may be a music signal that a user listens to. By using the music signal that the user listens to as a part of the audio reference signal for leakage compensation, the leakage compensation of the headphone can be achieved while the user is enjoying the music, which can improve the user's listening experience of the headphone in real time or near real time. Compared with the pilot tone signal, the music signal that the user listens to may have richer frequency components and a wider frequency range (such as 20 Hz-20 KHz), so that a current frequency response with a wider frequency range can be obtained for an acoustic path from speaker 206 to microphone 208. As described below, the current frequency response with the wider frequency range can be compared with pre-tuned reference frequency responses under different leakage conditions, so that the impact of the leakage to music loudness especially in the low frequency band can be compensated.

Next, the audio signal may be processed by DAC 204 and played by 206. Microphone 208 may generate a microphone signal responsive to the audio signal being played by speaker 206. The microphone signal may be processed by ADC 210 to generate an audio feedback signal. Since the audio signal is a combination of the first music signal and the pilot tone signal, the audio feedback signal may be a combination of a music feedback signal and a pilot tone feedback signal.

Then, compensation determination module 216 may determine one or more compensation parameters of compensation filter 218 based on the audio reference signal and the audio feedback signal. Specifically, compensation determination module 216 may determine a current frequency response of an acoustic path from speaker 206 to microphone 208 based on the audio signal and the audio feedback signal. The current frequency response may include a music frequency band and a pilot tone frequency band. Compensation determination module 216 may determine the one or more compensation parameters of compensation filter 218 based on the current frequency response of the acoustic path and a predetermined matching relationship between a group of reference frequency responses of the acoustic path and a group of reference parameter sets of compensation filter 218.

For example, compensation determination module 216 may determine, from the group of reference frequency responses, a first reference frequency response that matches the current frequency response in a predetermined music frequency band. That is, a maximum difference or an average difference between a curve of the first reference frequency response in the predetermined music frequency band and a curve of the current frequency response in the predetermined music frequency band is not greater than a predetermined matching threshold. Compensation determination module 216 may also determine, from the group of reference frequency responses, a second reference frequency response that matches the current frequency response in a predetermined pilot tone frequency band. That is, a maximum difference or an average difference between a curve of the second reference frequency response in the predetermined pilot tone frequency band and a curve of the current frequency response in the predetermined pilot tone frequency band is not greater than the predetermined matching threshold.

Compensation determination module 216 may determine, from the group of reference parameter sets, (a) a first reference parameter set corresponding to the first reference frequency response and (b) a second reference parameter set corresponding to the second reference frequency response. Compensation determination module 216 may determine the one or more compensation parameters based on the first and second reference parameter sets. For example, compensation determination module 216 may determine a deviation between the first and second reference frequency responses. For example, the deviation between the first and second reference frequency responses may be a maximum difference or an average difference between the first and second reference frequency responses. Responsive to the deviation being smaller than a deviation threshold, compensation determination module 216 may determine the one or more compensation parameters based on a weighted combination of the first and second reference parameter sets (e.g., each compensation parameter being a weighted combination of corresponding reference compensation parameters in the first and second reference parameter sets).

Consistent with the present disclosure, it is contemplated that the music reference signal with the signal strength smaller than the first signal threshold may be disturbed by noise easily, resulting in a possible response deviation of the current frequency response from its true value. However, when the deviation of the first and second reference frequency responses is smaller than the deviation threshold, using both the first and second reference parameter sets to determine the one or more compensation parameters can reduce the impact of the interference on the leakage compensation performance, when compared to using only one of the first and second reference parameter sets. Therefore, the robustness of the leakage compensation function can be improved.

Consistent with the present disclosure, the predetermined music frequency band may be between 20 Hz-20000 Hz, and the predetermined pilot tone frequency band may be between 10 Hz-20 Hz. In view of the wider frequency band and richer frequency components of the predetermined music frequency band than the predetermined pilot tone frequency band, a first weight of the first reference parameter set may be greater than a second weight of the second reference parameter set, when combining the first and second reference parameter sets to determine the one or more compensation parameters of compensation filter 218.

Alternatively, responsive to (a) the deviation between the first and second reference frequency responses being equal to or greater than the deviation threshold and (b) the strength of the music reference signal (or the first music signal) is smaller than the first signal threshold and greater than a second signal threshold, compensation determination module 216 may determine the one or more compensation parameters based on the first reference parameter set. For example, the one or more compensation parameters are determined to be one or more corresponding reference compensation parameters included in the first reference parameter set.

In this case, the deviation between the first and second reference frequency responses is greater than the deviation threshold, which indicates that the signal components in the predetermined pilot tone frequency range are affected by low frequency interference. Thus, the second reference frequency response which matches the current frequency response in the predetermined pilot tone frequency band may be no longer reliable for the determination of the compensation parameters. Thus, only the first reference frequency response, which matches the current frequency response in the predetermined music frequency band, is used for the determination of the compensation parameters. As a result, the performance of the leakage compensation function is not deteriorated by the low frequency interference, and the robustness of the leakage compensation function is guaranteed.

Subsequently, compensation determination module 216 may configure compensation filter 218 using the one or more compensation parameters. A second music signal to be played by speaker 206 may be processed using compensation filter 218 to generate a leakage-compensated music signal as described above with reference to FIG. 2B. Thus, the leakage-compensated music signal can be played by speaker 206 to improve the listening experience of the headphone.

Consistent with the present disclosure, through the application of compensation filter 218, the listening experience of the headphone can be less affected by the leakage condition and noise pollution in various application scenarios. For example, through the application of compensation filter 218, the listening experience of the headphone is not affected by the difference in the wearing manner of the headphone (e.g., a wearing tightness of the headphone), the difference in the structures of the users' ear canals, the difference in the device attributes (such as frequency response attributes), and different device performance of the headphone in different periods of usage (e.g., different usage times of the headphone, etc.), etc. As a result, the headphone can be used in various application scenarios with high-quality listening experience.

Figure 2G:
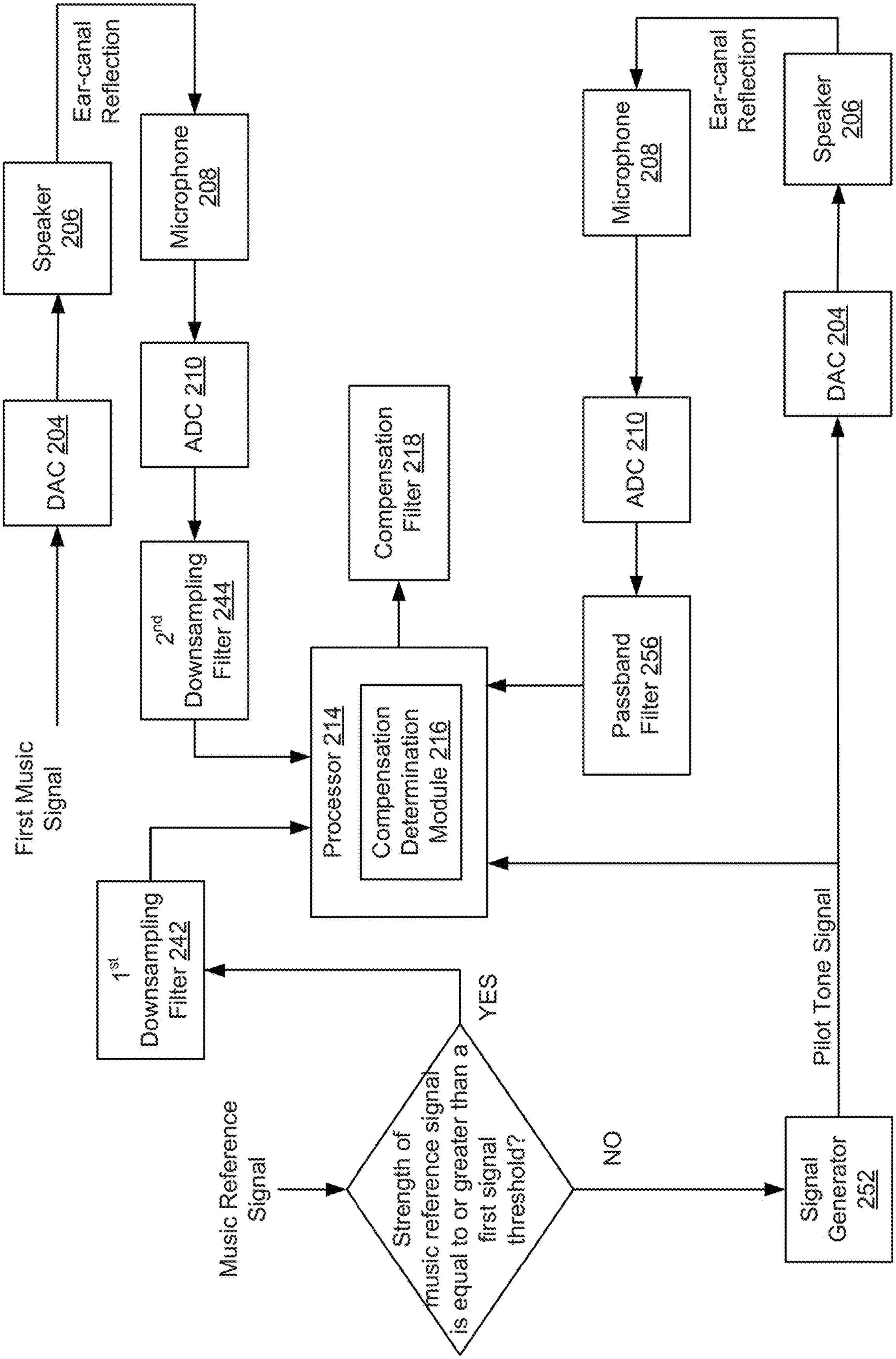

FIG. 2G illustrates an exemplary scenario when an audio signal to be played by speaker 206 includes either a first music signal or a pilot tone signal, according to some aspects of the present disclosure. Initially, the first music signal may be filtered by reference-path filter 232 (e.g., as shown in FIG. 2C) to generate a music reference signal. It is determined whether a strength of the music reference signal is equal to or greater than a first signal threshold. If the strength of the music reference signal is equal to or greater than the first signal threshold, only the music reference signal (without the pilot tone signal) is included in an audio reference signal for the calculation of compensation parameters. However, if the strength of the music reference signal is smaller than the first signal threshold, only the pilot tone signal (without the music reference signal) is included in an audio reference signal for the calculation of compensation parameters.

In a first case when the strength of the music reference signal is equal to or greater than the first signal threshold, the music reference signal can be downsampled by first downsampling filter 242 and fed to compensation determination module 216. The first music signal may be processed by DAC 204 and then played by speaker 206 to generate an acoustic signal. Through the ear-canal reflection, microphone 208 may capture at least part of the acoustic signal and generate a microphone signal. The microphone signal may be processed by ADC 210 and downsampled by second downsampling filter 244 to generate a music feedback signal. The music feedback signal can be fed to compensation determination module 216. In some implementations, first downsampling filter 242 and second downsampling filter 244 may downsample corresponding signals to be below 1 kHz, respectively, so that the calculation burden of a frequency response of an acoustic path from speaker 206 to microphone 208 can be reduced. Compensation determination module 216 may determine one or more compensation parameters of compensation filter 218 based on the music reference signal and the music feedback signal.

In a second case when the strength of the music reference signal is smaller than the first signal threshold, signal generator 252 may generate a pilot tone signal and feed the pilot tone signal to compensation determination module 216. The pilot tone signal may be processed by DAC 204 and then played by speaker 206 to generate an acoustic signal. Through the ear-canal reflection, microphone 208 may capture at least part of the acoustic signal and generate a microphone signal. The microphone signal may be processed by ADC 210 and filtered by passband filter 256 to generate a pilot tone feedback signal. The pilot tone feedback signal can be fed to compensation determination module 216. Compensation determination module 216 may determine one or more compensation parameters of compensation filter 218 based on the pilot tone signal and the pilot tone feedback signal.

In either the first case or the second case, compensation determination module 216 may configure compensation filter 218 using the one or more compensation parameters. Then, a second music signal to be played by speaker 206 may be processed using compensation filter 218 to generate a leakage-compensated music signal as described above. Thus, the leakage-compensated music can be played by speaker 206 to improve the listening experience of the headphone.

Figure 3A:
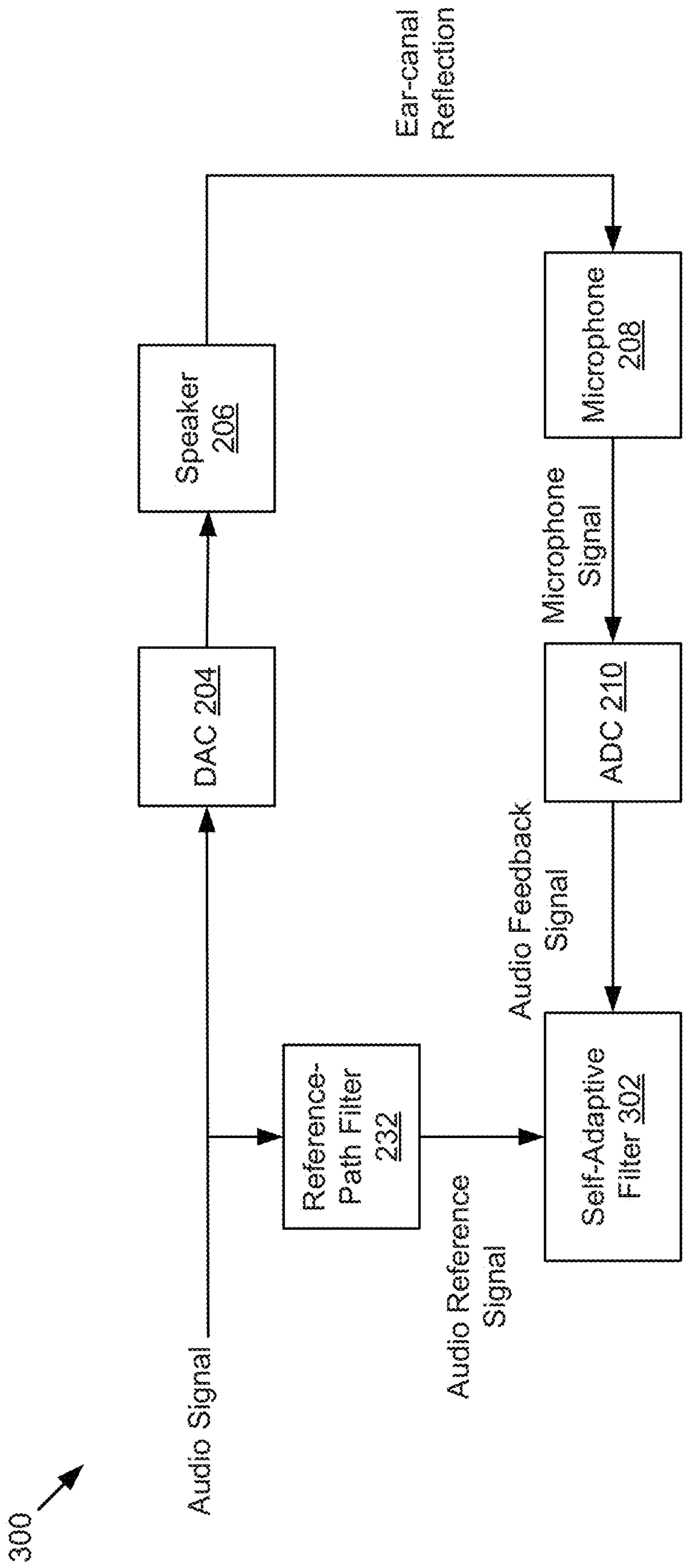
FIG. 3A illustrates a block diagram of an exemplary process for determining a self-adaptive filter used as a compensation filter, according to some aspects of the present disclosure.

FIG. 3A illustrates a block diagram of an exemplary process 300 for determining a self-adaptive filter used as a compensation filter, according to some aspects of the present disclosure. An audio signal can be processed by reference-path filter 232 to generate an audio reference signal, which is fed to a self-adaptive filter 302. The audio signal may also be processed by DAC 204 and played by speaker 206 to generate an acoustic signal. Through the ear-canal reflection, microphone 208 may capture at least part of the acoustic signal and generate a microphone signal. The microphone signal may be processed by ADC 210 to generate an audio feedback signal. The audio feedback signal can be fed to self-adaptive filter 302.

Self-adaptive filter 302 is coupled between the audio reference signal and the audio feedback signal. Self-adaptive filter 302 may be configured to filter the audio feedback signal. Self-adaptive filter 302 can be a correction filter whose filter coefficients can be adjusted adaptively and obtained based on the audio reference signal and the audio feedback signal, so that the audio reference signal output by reference-path filter 232 and the audio feedback signal filtered by self-adaptive filter 302 can cancel out with each other.

Figure 3B:
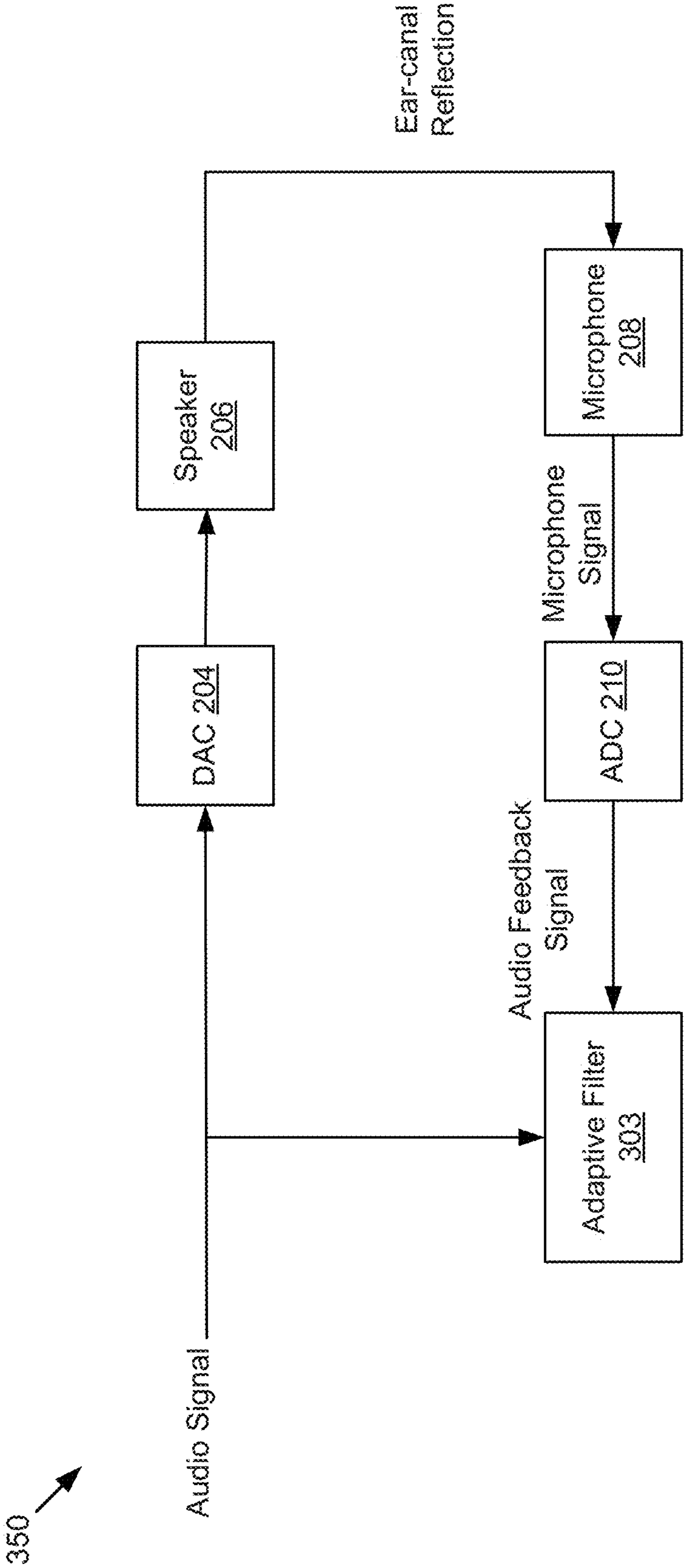
FIG. 3B illustrates an exemplary frequency response calculation method of an acoustic path from a speaker of a headphone to a microphone of the headphone using an audio signal and an audio feedback signal, according to some aspects of the present disclosure.

FIG. 3B illustrates an exemplary frequency response calculation method 350 of an acoustic path from a speaker (e.g., speaker 206) of a headphone to a microphone (e.g., 208) of the headphone using an audio signal and an audio feedback signal, according to some aspects of the present disclosure. An audio signal can be fed to an adaptive filter 303. The audio signal may also be processed by DAC 204 and played by speaker 206 to generate an acoustic signal. Through the ear-canal reflection, microphone 208 may capture at least part of the acoustic signal and generate a microphone signal. The microphone signal may be processed by ADC 210 to generate an audio feedback signal. The audio feedback signal can be fed to adaptive filter 303.

The filter coefficients of adaptive filter 303 obtained through an adaptive adjustment based on the audio signal inputted to DAC 204 and the audio feedback signal outputted from ADC 210 can be transformed into a frequency domain (e.g., using a fast Fourier transform (FFT)), so that a frequency response (e.g., an amplitude frequency response) of adaptive filter 303 can be obtained as the frequency response of the acoustic path from speaker 206 to microphone 208.

Figure 4:
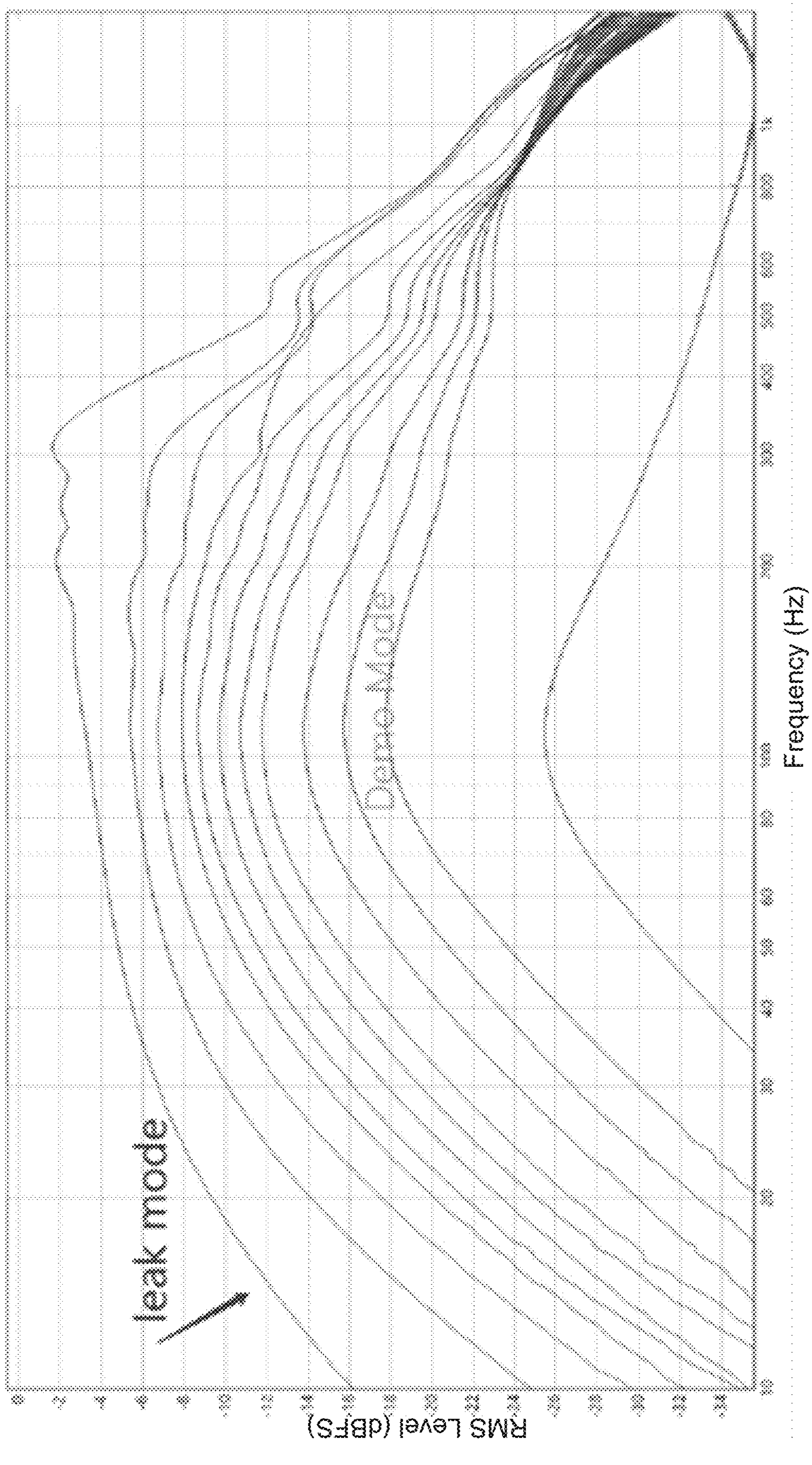
FIG. 4 is a graphical representation illustrating exemplary frequency responses of an acoustic path from a speaker of a headphone to a microphone of the headphone, according to some aspects of the present disclosure.

FIG. 4 is a graphical representation illustrating exemplary frequency responses of an acoustic path from a speaker (e.g., speaker 206) of a headphone to a microphone (e.g., microphone 208) of the headphone, according to some aspects of the present disclosure. Different frequency response curves in FIG. 4 may correspond to different leakage conditions of the headphone caused by different wearing tightness of the headphone. In some implementations, the frequency response curves of FIG. 4 can be used as a group of reference frequency responses for the headphone.

Figure 5:
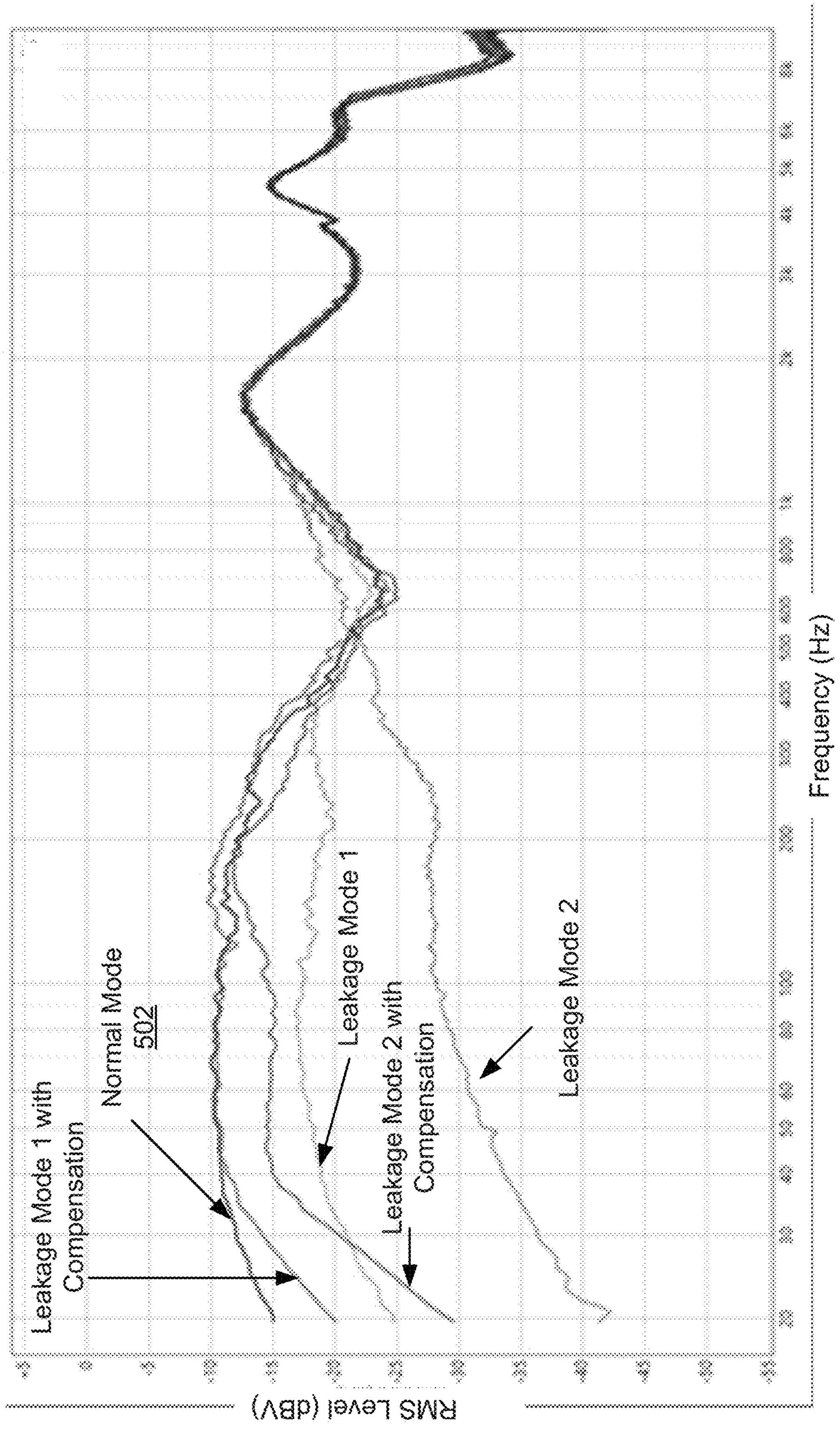
FIG. 5 is a graphical representation illustrating exemplary performance of a headphone when leakage compensation is applied, according to some aspects of the present disclosure.

FIG. 5 is a graphical representation illustrating exemplary performance of a headphone when leakage compensation is applied, according to some aspects of the present disclosure. Compared with a frequency response curve measured in a normal mode 502 (e.g., a mode without leakage), frequency response curves measured in leakage modes 1 and 2 are significantly attenuated in a frequency range of 20 Hz-600 Hz. However, by performing the leakage compensation function disclosed herein to the headphone, the attenuation of the frequency response curves measured in leakage modes 1 and 2 are greatly reduced in the frequency range of 20 Hz-600 Hz, as shown in frequency response curves labeled with “leakage mode 1 with compensation” and “leakage mode 2 with compensation,” respectively. Thus, the listening experience of the headphone can be improved under different leakage conditions through the leakage compensation of the headphone.

Figure 6:
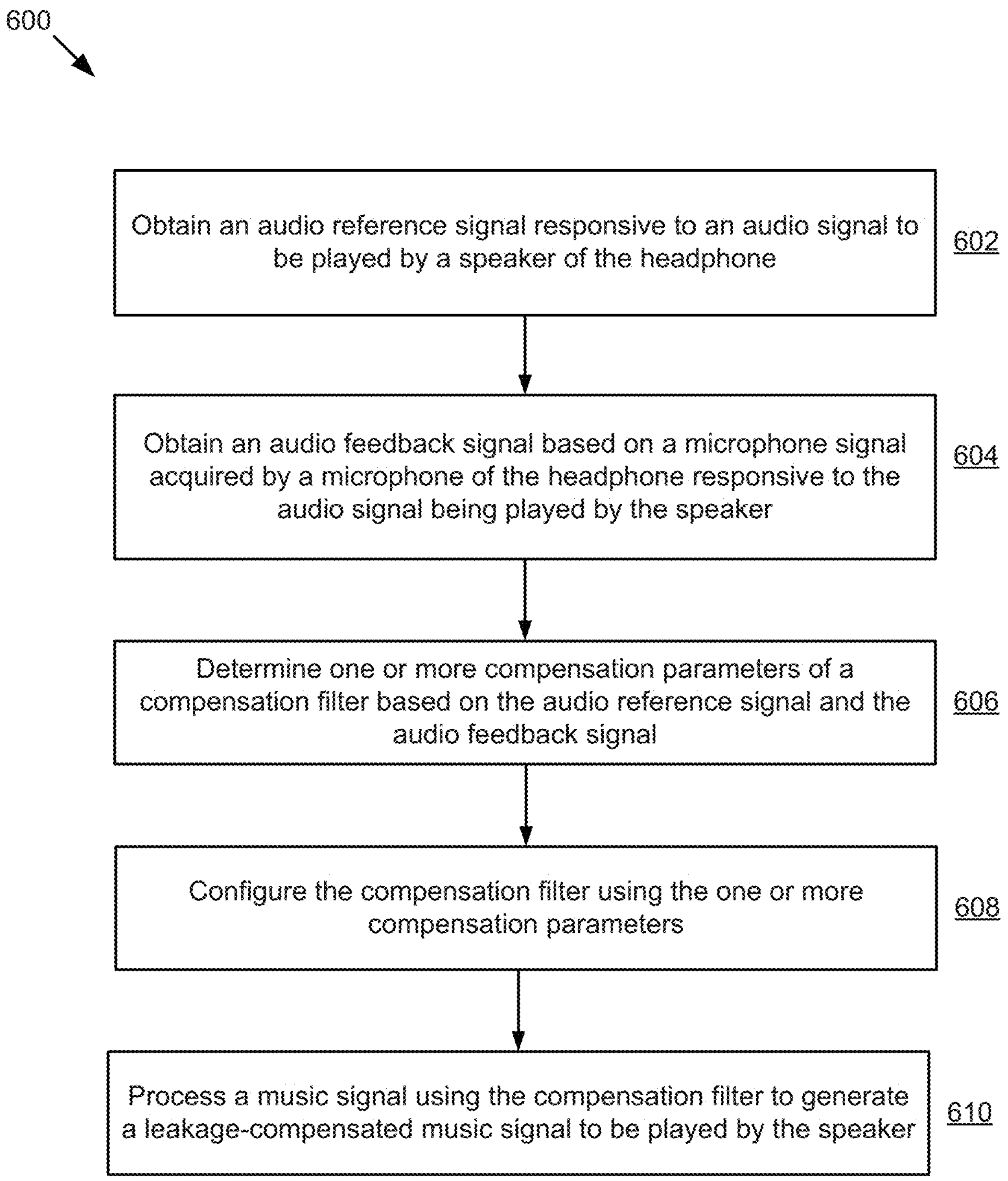
FIG. 6 illustrates a flowchart of an exemplary leakage compensation method for a headphone, according to some aspects of the present disclosure.

FIG. 6 illustrates a flowchart of an exemplary leakage compensation method 600 for a headphone, according to some aspects of the present disclosure. Method 600 may be implemented by a processor (e.g., processor 214) or any other suitable component of the headphone. It is understood that the operations shown in method 600 may not be exhaustive and that other operations can be performed as well before, after, or between any of the illustrated operations. Further, some of the operations may be performed simultaneously, or in a different order than shown in FIG. 6.

Referring to FIG. 6, method 600 starts at operation 602, in which an audio reference signal is obtained responsive to an audio signal to be played by a speaker of the headphone.

Method 600 proceeds to operation 604, as illustrated in FIG. 6, in which an audio feedback signal is obtained based on a microphone signal acquired by a microphone of the headphone responsive to the audio signal being played by the speaker.

Method 600 proceeds to operation 606, as illustrated in FIG. 6, in which one or more compensation parameters of a compensation filter (e.g., compensation filter 218) are determined based on the audio reference signal and the audio feedback signal.

Method 600 proceeds to operation 608, as illustrated in FIG. 6, in which the compensation filter is configured using the one or more compensation parameters.

Method 600 proceeds to operation 610, as illustrated in FIG. 6, in which a music signal is processed using the compensation filter to generate a leakage-compensated music signal to be played by the speaker.

Figure 7:
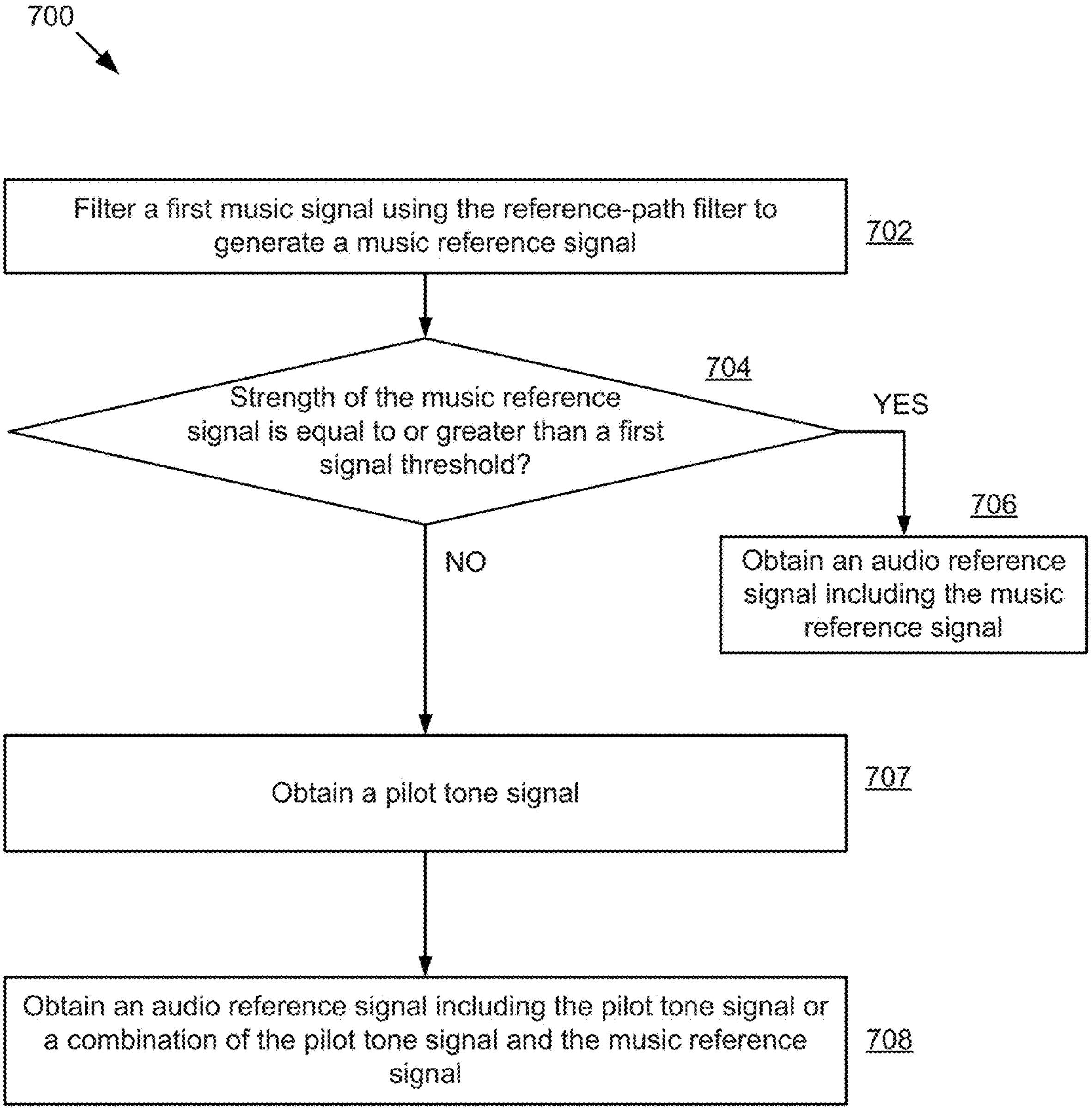
FIG. 7 illustrates a flowchart of an exemplary method for obtaining an audio reference signal, according to some aspects of the present disclosure.

FIG. 7 illustrates a flowchart of an exemplary method 700 for obtaining an audio reference signal, according to some aspects of the present disclosure. Method 700 may be implemented by a processor (e.g., processor 214) or any other suitable component of the headphone. Method 700 may be an exemplary implementation of operation 602 of FIG. 6. It is understood that the operations shown in method 700 may not be exhaustive and that other operations can be performed as well before, after, or between any of the illustrated operations. Further, some of the operations may be performed simultaneously, or in a different order than shown in FIG. 7.

Referring to FIG. 7, method 700 starts at operation 702, in which a first music signal is filtered using reference-path filter 232 to generate a music reference signal Method 700 proceeds to operation 704, as illustrated in FIG. 7, in which it is determined whether a strength of the music reference signal is equal to or greater than a first signal threshold. Responsive to the strength of the music reference signal being equal to or greater than the first signal threshold, method 700 proceeds to operation 706. Otherwise, method 700 proceeds to operation 707.

At operation 706, as illustrated in FIG. 7, an audio reference signal including the music reference signal is obtained.

At operation 707, as illustrated in FIG. 7, a pilot tone signal is obtained.

Method 700 proceeds to operation 708, as illustrated in FIG. 7, in which an audio reference signal including the pilot tone signal or a combination of the pilot tone signal and the music reference signal is obtained.

Figure 8:
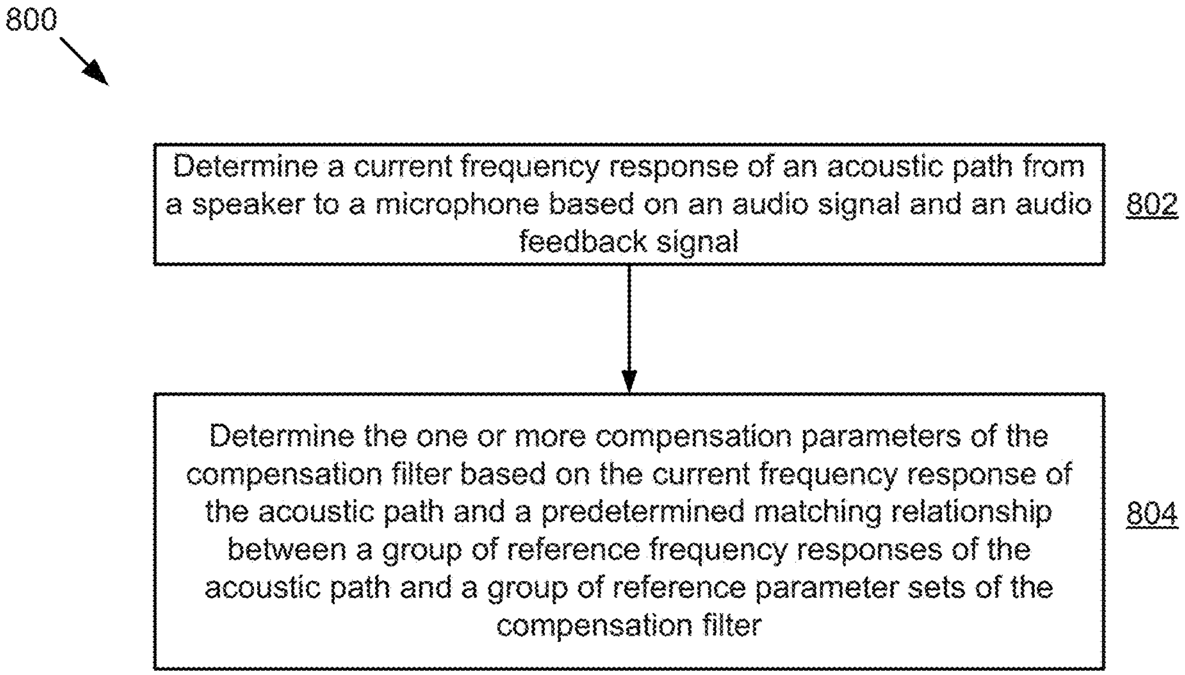
FIG. 8 illustrates a flowchart of an exemplary method for determining one or more compensation parameters of a compensation filter, according to some aspects of the present disclosure.

FIG. 8 illustrates a flowchart of an exemplary method 800 for determining one or more compensation parameters of a compensation filter, according to some aspects of the present disclosure. Method 800 may be implemented by a processor (e.g., processor 214) or any other suitable component of a headphone. Method 800 may be an exemplary implementation of operation 606 of FIG. 6. It is understood that the operations shown in method 800 may not be exhaustive and that other operations can be performed as well before, after, or between any of the illustrated operations. Further, some of the operations may be performed simultaneously, or in a different order than shown in FIG. 8.

Referring to FIG. 8, method 800 starts at operation 802, in which a current frequency response of an acoustic path from a speaker of the headphone to a microphone of the headphone is determined based on an audio signal and an audio feedback signal.

Method 800 proceeds to operation 804, as illustrated in FIG. 8, in which the one or more compensation parameters of the compensation filter are determined based on the current frequency response of the acoustic path and a predetermined matching relationship between a group of reference frequency responses of the acoustic path and a group of reference parameter sets of the compensation filter.

Figure 9:
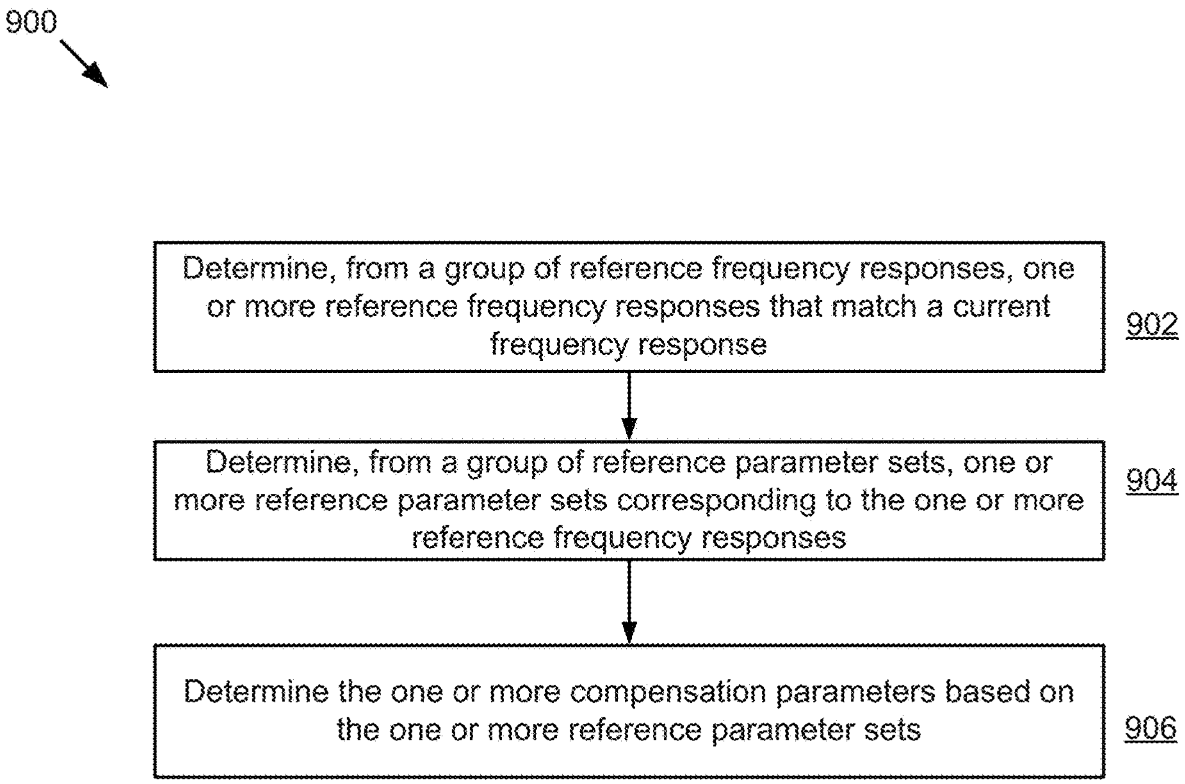
FIG. 9 illustrates a flowchart of another exemplary method for determining one or more compensation parameters of a compensation filter, according to some aspects of the present disclosure.

FIG. 9 illustrates a flowchart of another exemplary method 900 for determining one or more compensation parameters of a compensation filter, according to some aspects of the present disclosure. Method 900 may be implemented by a processor (e.g., processor 214) or any other suitable component of a headphone. Method 900 may be an exemplary implementation of operation 804 of FIG. 8. It is understood that the operations shown in method 900 may not be exhaustive and that other operations can be performed as well before, after, or between any of the illustrated operations. Further, some of the operations may be performed simultaneously, or in a different order than shown in FIG. 9.

Referring to FIG. 9, method 900 starts at operation 902, in which one or more reference frequency responses that match a current frequency response of an acoustic path from a speaker of the headphone to a microphone of the headphone are determined from a group of reference frequency responses.

Method 900 proceeds to operation 904, as illustrated in FIG. 9, in which one or more reference parameter sets corresponding to the one or more reference frequency responses are determined from a group of reference parameter sets, respectively.

Method 900 proceeds to operation 906, as illustrated in FIG. 9, in which the one or more compensation parameters are determined based on the one or more reference parameter sets.

According to one aspect of the present disclosure, a leakage compensation method for a headphone is disclosed. An audio reference signal is obtained responsive to an audio signal to be played by a speaker of the headphone. An audio feedback signal is obtained based on a microphone signal acquired by a microphone of the headphone responsive to the audio signal being played by the speaker. One or more compensation parameters of a compensation filter are determined based on the audio reference signal and the audio feedback signal. The compensation filter is configured using the one or more compensation parameters. A music signal is processed using the compensation filter to generate a leakage-compensated music signal to be played by the speaker.

In some implementations, the audio reference signal includes a music reference signal, a pilot tone signal, or a combination of the music reference signal and the pilot tone signal.

In some implementations, if a strength of the music reference signal is equal to or greater than a first signal threshold, the audio reference signal is configured to include the music reference signal; or if the strength of the music reference signal is smaller than the first signal threshold, the audio reference signal is configured to include the pilot tone signal or the combination of the music reference signal and the pilot tone signal.

In some implementations, responsive to the audio reference signal including the music reference signal, obtaining the audio reference signal includes: determining one or more reference parameters of a reference-path filter; configuring the reference-path filter using the one or more reference parameters; and filtering the audio signal using the reference-path filter to generate the music reference signal.

In some implementations, the audio signal is downsampled using a first downsampling filter. The audio feedback signal is downsampled using a second downsampling filter.

In some implementations, processing the music signal using the compensation filter to generate the leakage-compensated music signal to be played by the speaker includes: downsampling the music signal using a third downsampling filter to generate a downsampled music signal; filtering the downsampled music signal using the compensation filter to generate an intermediate music signal; upsampling the intermediate music signal using an upsampling filter to generate an upsampled intermediate music signal; and adding the upsampled intermediate music signal to the music signal to generate the leakage-compensated music signal.

In some implementations, responsive to the audio reference signal including the music reference signal, determining the one or more compensation parameters of the compensation filter includes determining filter coefficients of the compensation filter at a time point of n+1 as follows:

$$h(n+1) = h(n) + \mu\frac{y(n)e(n)}{y^T(n)y(n)},$$

$$f(n+1) = h(n+1) - [1, 0, 0, \ldots, 0],$$

where $h(n)=[h_0(n), h_1(n), h_2(n), \ldots, h_{M-1}(n)]^T$, f(n+1) denotes the filter coefficients of the compensation filter at the time point of n+1, n denotes an integer with n≥0, M denotes a length of the compensation filter, y denotes a step size of the compensation filter, $y(n)=[y(n), y(n-1), \ldots, y(n-M+1)]^T$ denotes the audio feedback signal at a time point of n, $e(n)=x(n)-h^T(n)y(n)$ denotes a residual signal at the time point of n, and x(n) denotes the music reference signal at the time point of n.

In some implementations, responsive to the audio reference signal including the pilot tone signal, obtaining the audio feedback signal includes: generating the microphone signal by the microphone of the headphone responsive to the audio signal being played by the speaker; and filtering the microphone signal using a passband filter to generate the audio feedback signal.

In some implementations, determining the one or more compensation parameters of the compensation filter based on the audio reference signal and the audio feedback signal includes: determining a current frequency response of an acoustic path from the speaker to the microphone based on the audio signal and the audio feedback signal; and determining the one or more compensation parameters of the compensation filter based on the current frequency response of the acoustic path and a predetermined matching relationship between a group of reference frequency responses of the acoustic path and a group of reference parameter sets of the compensation filter.

In some implementations, determining the one or more compensation parameters of the compensation filter based on the current frequency response of the acoustic path and the predetermined matching relationship includes: determining, from the group of reference frequency responses, one or more reference frequency responses that match the current frequency response; determining, from the group of reference parameter sets, one or more reference parameter sets corresponding to the one or more reference frequency responses; and determining the one or more compensation parameters based on the one or more reference parameter sets.

In some implementations, the audio reference signal includes a combination of a music reference signal and a pilot tone signal. Determining, from the group of reference frequency responses, one or more reference frequency responses that match the current frequency response includes: determining a first reference frequency response that matches the current frequency response in a predetermined music frequency band; and determining a second reference frequency response that matches the current frequency response in a predetermined pilot tone frequency band.

In some implementations, determining, from the group of reference parameter sets, the one or more reference parameter sets corresponding to the one or more reference frequency responses includes: determining, from the group of reference parameter sets, a first reference parameter set corresponding to the first reference frequency response; and determining, from the group of reference parameter sets, a second reference parameter set corresponding to the second reference frequency response.

In some implementations, determining the one or more compensation parameters based on the one or more reference parameter sets further includes determining a deviation between the first and second reference frequency responses.

In some implementations, determining the one or more compensation parameters based on the one or more reference parameter sets further includes: responsive to the deviation being smaller than a deviation threshold, determining the one or more compensation parameters based on a weighted combination of the first and second reference parameter sets.

In some implementations, determining the one or more compensation parameters based on the one or more reference parameter sets further includes: responsive to the deviation being equal to or greater than a deviation threshold and a strength of the music reference signal is smaller than a first signal threshold and greater than a second signal threshold, determining the one or more compensation parameters based on the first reference parameter set.

According to another aspect of the present disclosure, a headphone is disclosed. The headphone includes a speaker configured to play an audio signal. The headphone further includes a microphone configured to acquire a microphone signal responsive to the audio signal being played by the speaker. The headphone additionally includes a processor configured to: obtain an audio reference signal responsive to the audio signal to be played by the speaker; obtain an audio feedback signal based on the microphone signal; determine one or more compensation parameters of a compensation filter based on the audio reference signal and the audio feedback signal; and configure the compensation filter using the one or more compensation parameters. The headphone also includes a compensation filter configured to process a music signal to generate a leakage-compensated music signal to be played by the speaker.

In some implementations, the audio reference signal includes a music reference signal, a pilot tone signal, or a combination of the music reference signal and the pilot tone signal.

In some implementations, if a strength of the music reference signal is equal to or greater than a first signal threshold, the audio reference signal is configured to include the music reference signal; or if the strength of the music reference signal is smaller than the first signal threshold, the audio reference signal is configured to include the pilot tone signal or the combination of the music reference signal and the pilot tone signal.

In some implementations, to determine the one or more compensation parameters of the compensation filter based on the audio reference signal and the audio feedback signal, the processor is further configured to: determine a current frequency response of an acoustic path from the speaker to the microphone based on the audio signal and the audio feedback signal; and determine the one or more compensation parameters of the compensation filter based on the current frequency response of the acoustic path and a predetermined matching relationship between a group of reference frequency responses of the acoustic path and a group of reference parameter sets of the compensation filter.

According to yet another aspect of the present disclosure, a leakage compensation system for a headphone is disclosed. The leakage compensation system includes a memory storing code and a processor coupled to the memory. When the code is executed, the processor is configured to: obtain an audio reference signal responsive to an audio signal to be played by a speaker of the headphone; obtain an audio feedback signal based on a microphone signal acquired by a microphone of the headphone responsive to the audio signal being played by the speaker; determine one or more compensation parameters of a compensation filter based on the audio reference signal and the audio feedback signal; configure the compensation filter using the one or more compensation parameters; and process a music signal using the compensation filter to generate a leakage-compensated music signal to be played by the speaker.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A leakage compensation method for a headphone, comprising:

filtering an audio signal to be played by a speaker of the headphone to generate an audio reference signal comprising a music reference signal;

obtaining an audio feedback signal based on a microphone signal acquired by a microphone of the headphone responsive to the audio signal being played by the speaker;

determining one or more compensation parameters of a compensation filter which compensates for a leakage condition of the headphone based on the music reference signal and the audio feedback signal;

configuring the compensation filter using the one or more compensation parameters; and processing a music signal using the compensation filter to generate a leakage-compensated music signal to be played by the speaker, wherein filtering the audio signal to generate the audio reference signal comprises:

determining one or more reference parameters of a reference-path filter;

configuring the reference-path filter using the one or more reference parameters; and filtering the audio signal using the reference-path filter to generate the music reference signal, wherein the leakage compensation method further comprises:

downsampling the audio signal using a first downsampling filter; and downsampling the audio feedback signal using a second downsampling filter, and wherein processing the music signal using the compensation filter to generate the leakage-compensated music signal to be played by the speaker comprises:

downsampling the music signal using a third downsampling filter to generate a downsampled music signal;

filtering the downsampled music signal using the compensation filter to generate an intermediate music signal;

upsampling the intermediate music signal using an upsampling filter to generate an upsampled intermediate music signal; and adding the upsampled intermediate music signal to the music signal to generate the leakage-compensated music signal.

2. The leakage compensation method of claim 1, wherein the audio reference signal further comprises a pilot tone signal.

3. The leakage compensation method of claim 1, wherein:

if a strength of the music reference signal is equal to or greater than a first signal threshold, the audio reference signal is configured to comprise the music reference signal; or if the strength of the music reference signal is smaller than the first signal threshold, the audio reference signal is configured to comprise the music reference signal and a pilot tone signal.

4. The leakage compensation method of claim 1, wherein determining the one or more compensation parameters of the compensation filter comprises:

determining filter coefficients of the compensation filter at a time point of n+1 as follows:

$$h(n+1) = h(n) + \mu\frac{y(n)e(n)}{y^T(n)y(n)},$$

$$f(n+1) = h(n+1) - [1, 0, 0, \ldots, 0],$$

wherein $h(n)=[h_0(n), h_1(n), h_2(n), \ldots, h_{M-1}(n)]^T$, f(n+1) denotes the filter coefficients of the compensation filter at the time point of n+1, n denotes an integer with n≥0, M denotes a length of the compensation filter, u denotes a step size of the compensation filter, $y(n)=[y(n), y(n-1), \ldots, y(n-M+1)]^T$ denotes the audio feedback signal at a time point of n, $e(n)=x(n)-h^T(n)y(n)$ denotes a residual signal at the time point of n, and x(n) denotes the music reference signal at the time point of n.

5. The leakage compensation method of claim 2, wherein responsive to the audio reference signal comprising the pilot tone signal, obtaining the audio feedback signal comprises:

generating the microphone signal by the microphone of the headphone responsive to the audio signal being played by the speaker; and filtering the microphone signal using a passband filter to generate the audio feedback signal.

6. The leakage compensation method of claim 1, wherein determining the one or more compensation parameters of the compensation filter comprises:

determining a current frequency response of an acoustic path from the speaker to the microphone based on the audio signal and the audio feedback signal; and determining the one or more compensation parameters of the compensation filter based on the current frequency response of the acoustic path and a predetermined matching relationship between a group of reference frequency responses of the acoustic path and a group of reference parameter sets of the compensation filter.

7. The leakage compensation method of claim 6, wherein determining the one or more compensation parameters of the compensation filter based on the current frequency response of the acoustic path and the predetermined matching relationship comprises:

determining, from the group of reference frequency responses, one or more reference frequency responses that match the current frequency response;

determining, from the group of reference parameter sets, one or more reference parameter sets corresponding to the one or more reference frequency responses; and determining the one or more compensation parameters based on the one or more reference parameter sets.

8. The leakage compensation method of claim 7, wherein:

the audio reference signal comprises the music reference signal and a pilot tone signal; and determining, from the group of reference frequency responses, one or more reference frequency responses that match the current frequency response comprises:

determining a first reference frequency response that matches the current frequency response in a predetermined music frequency band; and determining a second reference frequency response that matches the current frequency response in a predetermined pilot tone frequency band.

9. The leakage compensation method of claim 8, wherein determining, from the group of reference parameter sets, the one or more reference parameter sets corresponding to the one or more reference frequency responses comprises:

determining, from the group of reference parameter sets, a first reference parameter set corresponding to the first reference frequency response; and determining, from the group of reference parameter sets, a second reference parameter set corresponding to the second reference frequency response.

10. The leakage compensation method of claim 9, wherein determining the one or more compensation parameters based on the one or more reference parameter sets further comprises:

determining a deviation between the first and second reference frequency responses.

11. The leakage compensation method of claim 10, wherein determining the one or more compensation parameters based on the one or more reference parameter sets further comprises:

responsive to the deviation being smaller than a deviation threshold, determining the one or more compensation parameters based on a weighted combination of the first and second reference parameter sets.

12. The leakage compensation method of claim 10, wherein determining the one or more compensation parameters based on the one or more reference parameter sets further comprises:

responsive to the deviation being equal to or greater than a deviation threshold and a strength of the music reference signal is smaller than a first signal threshold and greater than a second signal threshold, determining the one or more compensation parameters based on the first reference parameter set.

13. A headphone comprising:

a speaker configured to play an audio signal;

a microphone configured to acquire a microphone signal responsive to the audio signal being played by the speaker;

a processor configured to:

filter the audio signal to be played by the speaker to generate an audio reference signal comprising a music reference signal;

obtain an audio feedback signal based on the microphone signal;

determine one or more compensation parameters of a compensation filter which compensates for a leakage condition of the headphone based on the music reference signal and the audio feedback signal; and configure the compensation filter using the one or more compensation parameters; and a compensation filter configured to process a music signal to generate a leakage-compensated music signal to be played by the speaker, wherein the headphone further comprises a reference-path filter, a first downsampling filter, a second downsampling filter, a third downsampling filter, and an upsampling filter, wherein to filter the audio signal to generate the audio reference signal, the processor is further configured to:

determine one or more reference parameters of the reference-path filter;

configure the reference-path filter using the one or more reference parameters; and filter the audio signal using the reference-path filter to generate the music reference signal, wherein the processor is further configured to:

downsample the audio signal using the first downsampling filter; and downsample the audio feedback signal using the second downsampling filter, and wherein the processor is further configured to:

downsample the music signal using the third downsampling filter to generate a downsampled music signal;

filter the downsampled music signal using the compensation filter to generate an intermediate music signal;

upsample the intermediate music signal using the upsampling filter to generate an upsampled intermediate music signal; and add the upsampled intermediate music signal to the music signal to generate the leakage-compensated music signal.

14. The headphone of claim 13, wherein the audio reference signal further comprises a pilot tone signal.

15. The headphone of claim 13, wherein:

if a strength of the music reference signal is equal to or greater than a first signal threshold, the audio reference signal is configured to comprise the music reference signal; or if the strength of the music reference signal is smaller than the first signal threshold, the audio reference signal is configured to comprise the music reference signal and a pilot tone signal.

16. The headphone of claim 13, wherein to determine the one or more compensation parameters of the compensation filter, the processor is further configured to:

determine a current frequency response of an acoustic path from the speaker to the microphone based on the audio signal and the audio feedback signal; and determine the one or more compensation parameters of the compensation filter based on the current frequency response of the acoustic path and a predetermined matching relationship between a group of reference frequency responses of the acoustic path and a group of reference parameter sets of the compensation filter.

17. A leakage compensation system for a headphone, comprising:

a memory storing code; and a processor coupled to the memory, wherein when the code is executed, the processor is configured to:

filter an audio signal to be played by a speaker of the headphone to generate an audio reference signal comprising a music reference signal;

obtain an audio feedback signal based on a microphone signal acquired by a microphone of the headphone responsive to the audio signal being played by the speaker;

determine one or more compensation parameters of a compensation filter which compensates for a leakage condition of the headphone based on the music reference signal and the audio feedback signal;

configure the compensation filter using the one or more compensation parameters; and process a music signal using the compensation filter to generate a leakage-compensated music signal to be played by the speaker, wherein to filter the audio signal to generate the audio reference signal, the processor is further configured to:

determine one or more reference parameters of a reference-path filter;

configure the reference-path filter using the one or more reference parameters; and filter the audio signal using the reference-path filter to generate the music reference signal, wherein the processor is further configured to:

downsample the audio signal using a first downsampling filter; and downsample the audio feedback signal using a second downsampling filter, and wherein to process the music signal using the compensation filter to generate the leakage-compensated music signal to be played by the speaker, the processor is further configured to:

downsample the music signal using a third downsampling filter to generate a downsampled music signal;

filter the downsampled music signal using the compensation filter to generate an intermediate music signal;

upsample the intermediate music signal using an upsampling filter to generate an upsampled intermediate music signal; and add the upsampled intermediate music signal to the music signal to generate the leakage-compensated music signal.

* * * * *